(12) United States Patent
Richeson et al.

(10) Patent No.: US 9,498,932 B2
(45) Date of Patent: Nov. 22, 2016

(54) MULTI-LAYERED MELTBLOWN COMPOSITE AND METHODS FOR MAKING SAME

(75) Inventors: Galen C. Richeson, Humble, TX (US); Alistair D. Westwood, Kingwood, TX (US);
(Continued)

(73) Assignee: ExxonMobil Chemical Patents Inc., Baytown, TX (US)

(*) Notice: Subject to any disclaimer, the term of this patent is extended or adjusted under 35 U.S.C. 154(b) by 355 days.

(21) Appl. No.: 12/894,955

(22) Filed: Sep. 30, 2010

(65) Prior Publication Data
US 2011/0081529 A1    Apr. 7, 2011

Related U.S. Application Data

(60) Provisional application No. 61/248,254, filed on Oct. 2, 2009, provisional application No. 61/264,009, filed on Nov. 24, 2009.

(51) Int. Cl.
*B32B 5/26* (2006.01)
*B32B 5/06* (2006.01)
(Continued)

(52) U.S. Cl.
CPC ............... *B32B 5/26* (2013.01); *B32B 5/022* (2013.01); *B32B 5/04* (2013.01); *B32B 5/06* (2013.01);
(Continued)

(58) Field of Classification Search
CPC ............ B32B 27/35; B32B 27/08; B32B 5/04; B32B 5/06; B32B 5/08; B32B 5/022;
(Continued)

(56) References Cited

U.S. PATENT DOCUMENTS

| 3,149,178 A | 9/1964 | Hamilton et al. |
| 3,338,992 A | 8/1967 | Kinney |
| (Continued) | | |

FOREIGN PATENT DOCUMENTS

| CA | 1 268 753 | 5/1990 |
| EP | 0 129 368 | 12/1984 |
| (Continued) | | |

OTHER PUBLICATIONS

Tinius Olsen, Mechanical Properties and Tests, archived Mar. 24, 2005, http://web.archive.org/web/20050324192337/http://www.tiniusolsen.com/resource-center/mechanical-properties-U.html.*
(Continued)

*Primary Examiner* — Jennifer Chriss
*Assistant Examiner* — Frank Vineis
(74) *Attorney, Agent, or Firm* — Priya G. Prasad

(57) ABSTRACT

Multilayer meltblown composites, articles made therefrom, and methods for making same. One method can include meltblowing a first material to form a first meltblown layer; meltblowing a second material to form a second meltblown layer; and meltblowing a third material to form a third meltblown layer, wherein each material is the same or different, each material includes at least one resin having a MFR of about 2,000 dg/min or less, as measured by ASTM D1238, 2.16 kg, 230° C., and at least one of the first, second, and third materials comprises an elastomer having a recovery of at least 70% after 100% deformation, as determined by ASTM D412.

21 Claims, 5 Drawing Sheets

(75) Inventors: William Michael Ferry, Houston, TX (US)

(51) Int. Cl.

| | |
|---|---|
| *D01F 6/30* | (2006.01) |
| *B32B 5/04* | (2006.01) |
| *B32B 5/08* | (2006.01) |
| *D01D 5/098* | (2006.01) |
| *D04H 3/12* | (2006.01) |
| *D04H 3/14* | (2012.01) |
| *D04H 3/16* | (2006.01) |
| *B32B 5/02* | (2006.01) |
| *B32B 5/22* | (2006.01) |

(52) U.S. Cl.
CPC . *B32B 5/08* (2013.01); *B32B 5/22* (2013.01); *D01D 5/0985* (2013.01); *D01F 6/30* (2013.01); *D04H 3/12* (2013.01); *D04H 3/14* (2013.01); *D04H 3/16* (2013.01); *B32B 2250/20* (2013.01); *B32B 2262/0207* (2013.01); *B32B 2262/0253* (2013.01); *B32B 2262/14* (2013.01); *B32B 2307/51* (2013.01); *B32B 2307/718* (2013.01); *B32B 2437/00* (2013.01); *B32B 2555/00* (2013.01); *B32B 2555/02* (2013.01); *Y10T 428/24942* (2015.01); *Y10T 442/659* (2015.04)

(58) Field of Classification Search
CPC ............... B32B 5/02; B32B 5/22; B32B 5/26; B32B 2307/718; B32B 2307/51; B32B 2262/0253; B32B 2262/0207; B32B 2262/14; B32B 2250/20; B32B 2555/00; B32B 2555/02; B32B 2437/00; D04H 1/42–1/4391; D04H 3/16; D04H 1/54–1/565; D04H 3/12; D04H 3/14; D01D 5/0985; D01F 6/30; Y10T 442/60; Y10T 442/601; Y10T 442/602; Y10T 442/659; Y10T 442/668; Y10T 442/671; Y10T 442/68
USPC ......... 428/98, 212, 218, 219, 221, 340, 500, 428/515, 516, 517; 442/327, 328, 329, 381, 442/400
See application file for complete search history.

(56) References Cited

U.S. PATENT DOCUMENTS

| | | |
|---|---|---|
| 3,341,394 A | 9/1967 | Kinney |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 4,042,740 A | 8/1977 | Krueger |
| 4,100,324 A | 7/1978 | Anderson et al. |
| 4,103,058 A | 7/1978 | Humlicek |
| 4,105,381 A | 8/1978 | Platt et al. |
| 4,116,892 A | 9/1978 | Schwarz |
| 4,144,008 A | 3/1979 | Schwarz |
| 4,153,751 A | 5/1979 | Schwarz |
| 4,177,312 A | 12/1979 | Rasen et al. |
| 4,209,563 A | 6/1980 | Sisson |
| 4,223,059 A | 9/1980 | Schwarz |
| 4,251,585 A | 2/1981 | Schwarz |
| 4,252,590 A | 2/1981 | Rasen et al. |
| 4,285,100 A | 8/1981 | Schwarz |
| 4,289,832 A | 9/1981 | Schwarz |
| 4,340,563 A | 7/1982 | Appel et al. |
| 4,368,565 A | 1/1983 | Schwarz |
| 4,380,570 A | 4/1983 | Schwarz |
| 4,410,602 A | 10/1983 | Komoda et al. |
| 4,461,872 A | 7/1984 | Su |
| 4,540,753 A | 9/1985 | Cozewith et al. |
| 4,657,802 A | 4/1987 | Morman |
| 4,775,579 A | 10/1988 | Hagy et al. |
| 4,818,464 A | 4/1989 | Lau |
| 4,827,064 A | 5/1989 | Wu |
| 4,827,073 A | 5/1989 | Wu |
| 4,950,720 A | 8/1990 | Randall, Jr. et al. |
| 4,965,122 A | 10/1990 | Morman |
| 4,981,747 A | 1/1991 | Morman |
| 5,017,714 A | 5/1991 | Welborn, Jr. |
| 5,055,438 A | 10/1991 | Canich |
| 5,057,475 A | 10/1991 | Canich et al. |
| 5,078,935 A | 1/1992 | Kobayashi et al. |
| 5,096,867 A | 3/1992 | Canich |
| 5,108,820 A | 4/1992 | Kaneko et al. |
| 5,108,827 A | 4/1992 | Gessner |
| 5,114,787 A | 5/1992 | Chaplin et al. |
| 5,130,076 A | 7/1992 | Blatz et al. |
| 5,143,679 A | 9/1992 | Weber et al. |
| 5,145,727 A | 9/1992 | Potts et al. |
| 5,147,712 A | 9/1992 | Miyahara et al. |
| 5,153,157 A | 10/1992 | Hlatky et al. |
| 5,156,793 A | 10/1992 | Buell et al. |
| 5,167,897 A | 12/1992 | Weber et al. |
| 5,171,908 A | 12/1992 | Rudnick |
| 5,182,162 A | 1/1993 | Andrusko |
| 5,187,005 A | 2/1993 | Stahle et al. |
| 5,188,885 A | 2/1993 | Timmons et al. |
| 5,190,812 A | 3/1993 | Joseph et al. |
| 5,198,401 A | 3/1993 | Turner et al. |
| 5,226,992 A | 7/1993 | Morman |
| 5,227,224 A | 7/1993 | Ishikawa et al. |
| 5,230,949 A | 7/1993 | Howard et al. |
| 5,234,423 A | 8/1993 | Alemany et al. |
| 5,238,733 A | 8/1993 | Joseph et al. |
| 5,240,894 A | 8/1993 | Burkhardt et al. |
| 5,242,436 A | 9/1993 | Weil et al. |
| 5,244,724 A | 9/1993 | Antonacci et al. |
| 5,260,126 A | 11/1993 | Collier, IV et al. |
| 5,264,405 A | 11/1993 | Canich |
| 5,272,003 A | 12/1993 | Peacock |
| 5,288,791 A | 2/1994 | Collier, IV et al. |
| 5,292,389 A | 3/1994 | Tsuji et al. |
| 5,294,482 A | 3/1994 | Gessner |
| 5,306,545 A | 4/1994 | Shirayanagi et al. |
| 5,320,891 A | 6/1994 | Levy et al. |
| 5,324,576 A | 6/1994 | Reed et al. |
| 5,324,580 A | 6/1994 | Allan et al. |
| 5,324,800 A | 6/1994 | Welborn, Jr. et al. |
| 5,330,458 A | 7/1994 | Buell et al. |
| 5,330,829 A | 7/1994 | Miller |
| 5,332,613 A | 7/1994 | Taylor et al. |
| 5,334,636 A | 8/1994 | Fujii et al. |
| 5,336,457 A | 8/1994 | Wu et al. |
| 5,336,545 A | 8/1994 | Morman |
| 5,346,756 A | 9/1994 | Ogale et al. |
| 5,349,016 A | 9/1994 | DeNicola, Jr. et al. |
| 5,358,500 A | 10/1994 | Lavon et al. |
| 5,366,782 A | 11/1994 | Curro et al. |
| 5,366,786 A | 11/1994 | Connor et al. |
| 5,366,793 A | 11/1994 | Fitts, Jr. et al. |
| 5,368,584 A | 11/1994 | Clear et al. |
| 5,368,919 A | 11/1994 | Robeson |
| 5,368,927 A | 11/1994 | Lesca et al. |
| 5,372,885 A | 12/1994 | Tabor et al. |
| 5,382,400 A | 1/1995 | Pike et al. |
| 5,382,461 A | 1/1995 | Wu |
| 5,385,775 A | 1/1995 | Wright |
| 5,393,599 A | 2/1995 | Quantrille et al. |
| 5,418,045 A | 5/1995 | Pike et al. |
| 5,422,172 A | 6/1995 | Wu |
| 5,425,987 A | 6/1995 | Shawver et al. |
| 5,455,110 A | 10/1995 | Connor |
| 5,464,401 A | 11/1995 | Hasse et al. |
| 5,466,411 A | 11/1995 | Butterfass et al. |
| 5,472,775 A | 12/1995 | Obijeski et al. |
| 5,476,616 A | 12/1995 | Schwarz |
| 5,482,765 A | 1/1996 | Bradley et al. |

(56) References Cited

U.S. PATENT DOCUMENTS

| | | | |
|---|---|---|---|
| 5,482,772 A | 1/1996 | Strack et al. |
| 5,492,753 A | 2/1996 | Levy et al. |
| 5,496,298 A | 3/1996 | Kuepper et al. |
| 5,507,736 A | 4/1996 | Clear et al. |
| 5,523,141 A | 6/1996 | Fyler |
| 5,534,339 A | 7/1996 | Stokes |
| 5,534,340 A | 7/1996 | Gupta et al. |
| 5,536,563 A | 7/1996 | Shah et al. |
| 5,540,976 A | 7/1996 | Shawver et al. |
| 5,549,964 A | 8/1996 | Shohji et al. |
| 5,556,392 A | 9/1996 | Koczab |
| 5,573,841 A | 11/1996 | Adam et al. |
| 5,575,783 A | 11/1996 | Clear et al. |
| 5,591,152 A | 1/1997 | Buell et al. |
| 5,593,768 A | 1/1997 | Gessner |
| 5,607,798 A | 3/1997 | Kobylivker et al. |
| 5,616,408 A | 4/1997 | Oleszczuk et al. |
| 5,620,785 A | 4/1997 | Watt et al. |
| 5,628,741 A | 5/1997 | Buell et al. |
| 5,635,290 A | 6/1997 | Stopper et al. |
| 5,641,445 A | 6/1997 | Fauble et al. |
| 5,643,662 A | 7/1997 | Yeo et al. |
| 5,645,542 A | 7/1997 | Anjur et al. |
| 5,645,933 A | 7/1997 | Sakazume et al. |
| 5,652,051 A | 7/1997 | Shawver et al. |
| 5,653,704 A | 8/1997 | Buell et al. |
| 5,672,415 A | 9/1997 | Sawyer et al. |
| 5,674,216 A | 10/1997 | Buell et al. |
| 5,681,646 A | 10/1997 | Ofosu et al. |
| 5,688,157 A | 11/1997 | Bradley et al. |
| 5,690,627 A | 11/1997 | Clear et al. |
| 5,695,849 A | 12/1997 | Shawver et al. |
| 5,695,868 A | 12/1997 | McCormack |
| 5,698,480 A | 12/1997 | Geiman et al. |
| 5,720,832 A | 2/1998 | Minto et al. |
| 5,723,217 A | 3/1998 | Stahl et al. |
| 5,733,822 A | 3/1998 | Gessner et al. |
| 5,783,531 A | 7/1998 | Andrew et al. |
| 5,804,286 A | 9/1998 | Quantrille et al. |
| 5,817,403 A | 10/1998 | Gillyns et al. |
| 5,824,613 A | 10/1998 | Geiman et al. |
| 5,840,412 A | 11/1998 | Wood et al. |
| 5,843,057 A | 12/1998 | McCormack |
| 5,843,068 A | 12/1998 | Allen et al. |
| 5,861,202 A | 1/1999 | Kimura et al. |
| 5,866,488 A | 2/1999 | Terada et al. |
| 5,874,160 A | 2/1999 | Keck |
| 5,880,241 A | 3/1999 | Brookhart et al. |
| 5,883,028 A | 3/1999 | Morman et al. |
| 5,906,879 A | 5/1999 | Huntoon et al. |
| 5,910,362 A | 6/1999 | Aratake et al. |
| 5,914,084 A | 6/1999 | Benson et al. |
| 5,914,184 A | 6/1999 | Morman |
| 5,916,207 A | 6/1999 | Toyoda et al. |
| 5,921,973 A | 7/1999 | Newkirk et al. |
| 5,928,740 A | 7/1999 | Wilhoit et al. |
| 5,942,451 A | 8/1999 | Daponte et al. |
| 5,945,215 A | 8/1999 | Bersted et al. |
| 5,952,252 A | 9/1999 | Shawver et al. |
| 5,985,193 A | 11/1999 | Harrington et al. |
| 5,993,714 A | 11/1999 | Sawyer et al. |
| 5,994,244 A | 11/1999 | Fujiwara et al. |
| 6,015,605 A | 1/2000 | Tsujiyama et al. |
| 6,015,617 A | 1/2000 | Maugans et al. |
| 6,015,764 A | 1/2000 | McCormack et al. |
| 6,028,240 A | 2/2000 | Wessel et al. |
| 6,037,281 A | 3/2000 | Mathis et al. |
| 6,045,898 A | 4/2000 | Kishi et al. |
| 6,071,451 A | 6/2000 | Wang et al. |
| 6,075,179 A | 6/2000 | McCormack et al. |
| 6,080,818 A | 6/2000 | Thakker et al. |
| 6,083,583 A | 7/2000 | Klocek et al. |
| 6,090,472 A | 7/2000 | Wang et al. |
| 6,090,730 A | 7/2000 | Fujiwara et al. |
| 6,096,668 A | 8/2000 | Abuto et al. |
| 6,103,647 A | 8/2000 | Shultz et al. |
| 6,114,261 A | 9/2000 | Strelow et al. |
| 6,114,263 A | 9/2000 | Benson et al. |
| 6,117,546 A | 9/2000 | Geiman et al. |
| 6,140,551 A | 10/2000 | Niemeyer et al. |
| 6,182,732 B1 * | 2/2001 | Allen ............................ 156/441 |
| 6,207,237 B1 | 3/2001 | Haffner |
| 6,207,601 B1 | 3/2001 | Maurer et al. |
| 6,207,602 B1 | 3/2001 | Gessner et al. |
| 6,224,977 B1 | 5/2001 | Kobylivker et al. |
| 6,261,674 B1 | 7/2001 | Branham et al. |
| 6,268,203 B1 | 7/2001 | Johnson et al. |
| 6,268,302 B1 | 7/2001 | Ofosu et al. |
| 6,281,289 B1 | 8/2001 | Maugans et al. |
| 6,286,145 B1 | 9/2001 | Welchel et al. |
| 6,312,641 B1 | 11/2001 | Hutchinson |
| 6,323,389 B1 | 11/2001 | Thomas et al. |
| 6,342,565 B1 | 1/2002 | Cheng et al. |
| 6,352,426 B1 | 3/2002 | Hutchinson et al. |
| 6,355,348 B1 | 3/2002 | Takesue et al. |
| 6,362,389 B1 | 3/2002 | McDowall et al. |
| 6,372,172 B1 | 4/2002 | Sudduth et al. |
| 6,391,408 B1 | 5/2002 | Hutchinson |
| 6,410,465 B1 | 6/2002 | Lim et al. |
| 6,417,121 B1 | 7/2002 | Newkirk et al. |
| 6,417,122 B1 | 7/2002 | Newkirk et al. |
| 6,420,285 B1 | 7/2002 | Newkirk et al. |
| 6,443,940 B1 | 9/2002 | Ashton et al. |
| 6,444,774 B1 | 9/2002 | Stahl et al. |
| 6,458,726 B1 | 10/2002 | Harrington et al. |
| 6,465,073 B1 | 10/2002 | Morman et al. |
| 6,465,378 B2 | 10/2002 | Gessner et al. |
| 6,476,289 B1 | 11/2002 | Buell et al. |
| 6,478,785 B1 | 11/2002 | Ashton et al. |
| 6,482,896 B2 | 11/2002 | Maugans et al. |
| 6,503,853 B1 | 1/2003 | Kassner et al. |
| 6,506,695 B2 | 1/2003 | Gardner et al. |
| 6,506,698 B1 | 1/2003 | Quantrille et al. |
| 6,516,472 B2 | 2/2003 | Gessner et al. |
| 6,525,157 B2 | 2/2003 | Cozewith et al. |
| 6,559,262 B1 | 5/2003 | Waymouth et al. |
| 6,569,945 B2 | 5/2003 | Bugada et al. |
| 6,572,598 B1 | 6/2003 | Ashton et al. |
| 6,579,274 B1 | 6/2003 | Morman et al. |
| 6,582,414 B1 | 6/2003 | Richardson |
| 6,586,354 B1 | 7/2003 | Topolkaraev et al. |
| 6,589,892 B1 | 7/2003 | Smith et al. |
| 6,610,039 B1 | 8/2003 | Wilhelm et al. |
| 6,627,564 B1 | 9/2003 | Morman et al. |
| 6,632,212 B1 | 10/2003 | Morman et al. |
| 6,649,546 B2 | 11/2003 | Ohata |
| 6,649,547 B1 | 11/2003 | Arnold et al. |
| 6,676,883 B2 | 1/2004 | Hutchinson et al. |
| 6,717,028 B1 | 4/2004 | Oberstadt |
| 6,777,082 B2 | 8/2004 | Patel et al. |
| 6,780,272 B2 | 8/2004 | Wood |
| 6,881,793 B2 | 4/2005 | Sheldon et al. |
| 6,881,800 B2 | 4/2005 | Friedersdorf |
| 6,887,941 B2 | 5/2005 | Zhou |
| 6,902,796 B2 | 6/2005 | Morell et al. |
| 6,906,160 B2 | 6/2005 | Stevens et al. |
| 6,909,028 B1 | 6/2005 | Shawver et al. |
| 6,914,018 B1 | 7/2005 | Uitenbroek et al. |
| 6,927,184 B1 | 8/2005 | Jacobs-Hartwig et al. |
| 6,939,591 B2 | 9/2005 | Hutchinson et al. |
| 6,946,413 B2 | 9/2005 | Lange et al. |
| 6,960,635 B2 | 11/2005 | Stevens et al. |
| 6,982,231 B1 | 1/2006 | Uitenbroek et al. |
| 6,989,125 B2 | 1/2006 | Boney et al. |
| 6,992,158 B2 | 1/2006 | Datta et al. |
| 6,994,763 B2 | 2/2006 | Austin |
| 7,019,081 B2 | 3/2006 | Datta et al. |
| 7,022,632 B2 | 4/2006 | Hatta et al. |
| 7,026,404 B2 | 4/2006 | Cozewith et al. |
| 7,078,089 B2 | 7/2006 | Ellis et al. |
| 7,101,622 B2 | 9/2006 | Chang et al. |
| 7,101,623 B2 | 9/2006 | Jordan et al. |
| 7,199,203 B2 | 4/2007 | Stevens et al. |
| 7,261,551 B2 | 8/2007 | Hutchinson et al. |

(56) References Cited

U.S. PATENT DOCUMENTS

| | | |
|---|---|---|
| 7,300,895 B2 | 11/2007 | Kobayashi et al. |
| 7,318,961 B2 | 1/2008 | Loos et al. |
| 7,319,077 B2 | 1/2008 | Mehta et al. |
| 7,320,948 B2 | 1/2008 | Morman et al. |
| 7,329,621 B2 | 2/2008 | Collier, IV et al. |
| 7,332,204 B2 | 2/2008 | Hutchinson et al. |
| 7,335,273 B2 | 2/2008 | Neculescu et al. |
| 7,344,775 B2 | 3/2008 | Stevens et al. |
| 7,355,089 B2 | 4/2008 | Chang et al. |
| 7,355,091 B2 | 4/2008 | Kellenberger et al. |
| 7,404,811 B2 | 7/2008 | Ohnishi et al. |
| 7,405,171 B2 | 7/2008 | Tsujiyama et al. |
| 7,405,172 B2 | 7/2008 | Shigematsu et al. |
| 7,413,803 B2 | 8/2008 | Jordan et al. |
| 7,425,517 B2 | 9/2008 | Deka et al. |
| 7,438,777 B2 | 10/2008 | Pourdeyhimi et al. |
| 7,439,301 B2 | 10/2008 | Handlin, Jr. |
| 7,445,831 B2 | 11/2008 | Ashraf et al. |
| 7,445,838 B2 | 11/2008 | Quinn |
| 7,452,832 B2 | 11/2008 | Bansal et al. |
| 7,462,573 B2 | 12/2008 | Tsujiyama et al. |
| 7,476,447 B2 | 1/2009 | Thomas |
| 7,491,666 B2 | 2/2009 | Smith et al. |
| 7,494,709 B2 | 2/2009 | Davis |
| 7,494,947 B2 | 2/2009 | Boscolo |
| 7,501,034 B2 | 3/2009 | Ashraf |
| 7,601,666 B2 | 10/2009 | Rix et al. |
| 7,795,366 B2 | 9/2010 | Yang et al. |
| 2002/0019507 A1 | 2/2002 | Karandinos et al. |
| 2002/0055316 A1 | 5/2002 | Araida et al. |
| 2003/0125696 A1 | 7/2003 | Morman et al. |
| 2003/0194939 A1 | 10/2003 | Schwarz |
| 2004/0110442 A1 | 6/2004 | Rhim et al. |
| 2004/0121687 A1 | 6/2004 | Morman et al. |
| 2004/0209540 A1 | 10/2004 | Schwarz |
| 2004/0236042 A1 | 11/2004 | Datta et al. |
| 2005/0027080 A1 | 2/2005 | Bodiford et al. |
| 2005/0106978 A1 | 5/2005 | Cheng et al. |
| 2005/0130544 A1 | 6/2005 | Cheng et al. |
| 2005/0148263 A1 | 7/2005 | Zhou et al. |
| 2005/0170729 A1 | 8/2005 | Stadelman et al. |
| 2006/0003658 A1 | 1/2006 | Hall et al. |
| 2006/0135923 A1 | 6/2006 | Boggs et al. |
| 2006/0141886 A1 | 6/2006 | Brock et al. |
| 2006/0151914 A1 | 7/2006 | Gerndt et al. |
| 2006/0172647 A1 | 8/2006 | Mehta et al. |
| 2006/0173123 A1 | 8/2006 | Yang et al. |
| 2006/0199006 A1 | 9/2006 | Poon et al. |
| 2006/0210746 A1 | 9/2006 | Shi et al. |
| 2006/0270303 A1 | 11/2006 | Berrigan et al. |
| 2007/0017075 A1 | 1/2007 | Nguyen |
| 2007/0021561 A1* | 1/2007 | Tse .................. C08L 23/10 525/88 |
| 2007/0078222 A1 | 4/2007 | Chang et al. |
| 2007/0092704 A1 | 4/2007 | Patel et al. |
| 2007/0123131 A1 | 5/2007 | Nguyen et al. |
| 2007/0135785 A1 | 6/2007 | Qin et al. |
| 2007/0141937 A1 | 6/2007 | Hendrix et al. |
| 2007/0161747 A1 | 7/2007 | Maier et al. |
| 2007/0173162 A1 | 7/2007 | Ethiopia et al. |
| 2007/0184256 A1 | 8/2007 | Okada et al. |
| 2007/0197117 A1 | 8/2007 | Austin et al. |
| 2007/0202330 A1 | 8/2007 | Peng et al. |
| 2007/0203301 A1 | 8/2007 | Autran et al. |
| 2007/0203469 A1 | 8/2007 | Ohnishi et al. |
| 2007/0240605 A1* | 10/2007 | Iyer et al. .................... 106/31.6 |
| 2007/0254545 A1 | 11/2007 | Martin |
| 2007/0287348 A1 | 12/2007 | Autran et al. |
| 2008/0003910 A1 | 1/2008 | Hughes et al. |
| 2008/0014819 A1 | 1/2008 | Suzuki et al. |
| 2008/0026660 A1 | 1/2008 | Ogawa et al. |
| 2008/0038982 A1 | 2/2008 | Motomura et al. |
| 2008/0045917 A1 | 2/2008 | Autran et al. |
| 2008/0061476 A1 | 3/2008 | Hutchinson et al. |
| 2008/0076315 A1 | 3/2008 | McCormack et al. |
| 2008/0119102 A1 | 5/2008 | Hughes et al. |
| 2008/0132135 A1 | 6/2008 | Collias et al. |
| 2008/0132862 A1 | 6/2008 | Collias et al. |
| 2008/0132866 A1 | 6/2008 | Siqueira et al. |
| 2008/0160859 A1 | 7/2008 | Gupta et al. |
| 2008/0160862 A1 | 7/2008 | Sartori et al. |
| 2008/0161765 A1 | 7/2008 | Morman et al. |
| 2008/0172840 A1 | 7/2008 | Kacker et al. |
| 2008/0177242 A1 | 7/2008 | Chang et al. |
| 2008/0182116 A1 | 7/2008 | Dharmarajan et al. |
| 2008/0182468 A1 | 7/2008 | Dharmarajan et al. |
| 2008/0182473 A1 | 7/2008 | Chen et al. |
| 2008/0182940 A1 | 7/2008 | Dharmarajan et al. |
| 2008/0199673 A1 | 8/2008 | Allgeuer et al. |
| 2008/0207071 A1 | 8/2008 | Muslet et al. |
| 2008/0220273 A1 | 9/2008 | Weaver |
| 2008/0221540 A1 | 9/2008 | Thomas et al. |
| 2008/0233819 A1 | 9/2008 | Tsujiyama et al. |
| 2008/0233824 A1 | 9/2008 | Abed et al. |
| 2008/0237911 A1 | 10/2008 | Ardiff et al. |
| 2008/0241447 A1 | 10/2008 | Shi |
| 2008/0251492 A1 | 10/2008 | Shi |
| 2008/0287027 A1 | 11/2008 | Suzuki et al. |
| 2008/0299857 A1 | 12/2008 | Harding et al. |
| 2008/0300567 A1 | 12/2008 | Ohnishi et al. |
| 2008/0311815 A1 | 12/2008 | Gupta et al. |
| 2009/0068419 A1 | 3/2009 | Pascavage |
| 2009/0068420 A1 | 3/2009 | Pascavage |
| 2009/0124153 A1 | 5/2009 | Dharmarajan et al. |
| 2009/0124154 A1 | 5/2009 | Harrington et al. |
| 2010/0081352 A1 | 4/2010 | Westwood |
| 2010/0124864 A1 | 5/2010 | Dharmarajan et al. |
| 2010/0222755 A1 | 9/2010 | Westwood |
| 2010/0222761 A1 | 9/2010 | Westwood et al. |
| 2010/0266818 A1 | 10/2010 | Westwood et al. |
| 2010/0267914 A1 | 10/2010 | Westwood et al. |

FOREIGN PATENT DOCUMENTS

| | | |
|---|---|---|
| EP | 0 277 003 | 8/1988 |
| EP | 0 277 004 | 8/1988 |
| EP | 0 426 637 | 5/1991 |
| EP | 0 432 755 | 6/1991 |
| EP | 0 495 375 | 7/1992 |
| EP | 0 500 944 | 9/1992 |
| EP | 0 520 732 | 12/1992 |
| EP | 0 534 863 | 3/1993 |
| EP | 0 570 982 | 11/1993 |
| EP | 0 573 403 | 12/1993 |
| EP | 1 066 961 | 1/2001 |
| EP | 1 070 087 | 1/2001 |
| EP | 1 138 472 | 10/2001 |
| EP | 1 174 257 | 1/2002 |
| EP | 1 614 699 | 1/2006 |
| EP | 1 712 351 | 10/2006 |
| EP | 1 834 015 | 9/2007 |
| EP | 1 877 237 | 1/2008 |
| EP | 1 980 390 | 10/2008 |
| JP | 02/105833 | 4/2002 |
| JP | 2003-053894 A | 2/2003 |
| JP | 2005/171456 | 6/2005 |
| JP | 4753852 | 8/2007 |
| JP | 2007-277755 A | 10/2007 |
| WO | WO 91/09882 | 7/1991 |
| WO | WO 92/00333 | 1/1992 |
| WO | WO 92/16361 | 10/1992 |
| WO | WO 92/16366 | 10/1992 |
| WO | WO 94/03506 | 2/1994 |
| WO | WO 94/26816 | 11/1994 |
| WO | WO 98/39384 | 9/1998 |
| WO | WO 00/01745 | 1/2000 |
| WO | WO 0001745 A1 * | 1/2000 |
| WO | WO 00/18994 | 4/2000 |
| WO | WO 00/37723 | 6/2000 |
| WO | WO 00/38911 | 7/2000 |
| WO | WO 01/00915 | 1/2001 |
| WO | WO 01/00917 | 1/2001 |
| WO | WO 02/34511 | 5/2002 |
| WO | WO 02/36651 | 5/2002 |

(56) References Cited

FOREIGN PATENT DOCUMENTS

| WO | WO 03/040201 | 5/2003 |
|---|---|---|
| WO | WO 2004/038078 | 5/2004 |
| WO | WO 2005/049672 | 6/2005 |
| WO | WO 2006/101631 | 9/2006 |
| WO | WO 2007/030170 | 3/2007 |
| WO | WO 2007/140163 | 12/2007 |
| WO | WO 2007/142736 | 12/2007 |
| WO | WO 2008/094337 | 8/2008 |
| WO | WO 2009/064583 | 5/2009 |
| WO | WO 2009/126712 | 10/2009 |
| WO | WO 2010/001273 | 1/2010 |
| WO | WO 2010/039579 | 4/2010 |
| WO | WO 2010/039583 | 4/2010 |
| WO | WO 2010/098792 | 9/2010 |
| WO | WO 2010/098793 | 9/2010 |
| WO | WO 2011/041575 | 4/2011 |

OTHER PUBLICATIONS

ASTM International, ASTM D412 Standard Test Methods fo rVulcanized Rubber and Thermoplastic Elastomers, http://www.astm.org/Standards/D412.htm.*

PP3155 Material Property Data, http://www.matweb.com/search/datasheet.aspx?matguid=d32d7bd5f1ed4c1dbd86e2b7f6b63297.*

Richeson, G.C., Advantages of New Metallocene Based Meltblown Resins, TANDEC Conference, Nov. 18-20, 2003.*

Elastic Nonwoven Fabrics from Polyolefin Elastomers, ANTEC 2005 Plastics: Annual Technical Conference, vol. 2: Materials. Society of Plastics Engineers. 2005.*

Barden, B., "*Coated Fabrics*", Kirk-Othmer Encyclopedia of Chemical Technology, John Wiley & Sons, pp. 1-13 (1993).

Rooney, J.G. et al., "*On Line Determination by Light Scattering of Mechanical Degradation in the GPC Process*", Liquid Chromatography of Polymers and Related Materials III, Cazes, J. Ed., Marcel Dekker, pp. 207-234 (1981).

Chapman, R., "*Nonwoven Fabrics, Staple Fibers*", Kirk-Othmer Encyclopedia of Chemical Technology, John Wiley & Sons, pp. 1-27 (2005).

Cheng, H. N. "$^{13}C$ *NMR Analysis of Ethylene-Propylene Rubbers*", Macromolecules, vol. 17, pp. 1950-1955 (1984).

Index05 Daily News, Apr. 14, 2005, in association with Nonwovens Report International, pp. 4.

Index08, Geneva Palexpo Apr. 15-18, 2008, Biax-Fiberfilm Corporation.

E. P. Moore, Jr. ed., "9.2.1.1 Melt-Blown Fibers," in Polypropylene Handbook, Polymerization, Charaterization, Properties, Processing, Applications, pp. 314-324.

Prabhu, P. et al., "*Evidence for Ethylene-Propylene Block Copolymer Formation*", J. Poly. Sci.: Polymer Letters Ed., vol. 18, pp. 389-394 (1980).

Rudnick, L.R. et al., "*Poly(α-olefins)*", Synthetic Lubricants and High Performance Functional Fluids, $2^{nd}$ Edition, Marcel Dekker, Inc., pp. 3-52 (1999).

Seyam, A.M.et al., "*An Examination of the Hydroentangling Process Variables*", in Int'l Nonwovens J., pp. 25-33 (Spring 2005).

Ver Strate, G. et al., "*Near Monodisperse Ethylene-Propylene Copolymers by Direct Ziegler-Natta Polymerization. Preparation, Characterization, Properties*", Macromolecules, vol. 21, pp. 3360-3371 (1988).

Zhao, R., "*Melt Blowing Polyoxymethylene Copolymer*", in Int'l Nonwovens J., pp. 19-24 (Summer 2005).

Zhao, R., "Stretching the Value of Melt Blown with Cellulose Microfiber and Elastic Resin," A Paper for Insight 2004, Austin, Texas, USA, Oct. 10-14, 2004, Biax Fiberfilm Corporation, Greenville, Wisconsin, pp. 1-13.

Dharmarajan, N. et al., "*Tailoring the Performance of Specialty Polyolefin Elastomer Based Elastic Nonwoven Fabrics*", INTC® 2006, International Nonwovens Technical Conference, Conference Proceedings, Houston, TX, United States, Sep. 25-28, 2006.

Dutta, S. et al., "*More Efficient Manufacture of Controlled-rheology Polypropylene*", Society of Plastics Engineers, Plastics Research Online (2010).

Harringgton, B.A. et al., "*Processability and Fabric Attributes of Specialty Polyolefin Elastomers*", INTC® 2005, International Nonwovens Technical Conference, Conference Proceedings, St. Louis, MS, United States, Sep. 19-22, 2005.

Kacker, S. et al., "*Properties of Elastic Nonwoven Fabrics Based Upon Specialty Polyolefin Elastomers*", INTC® 2006, International Nonwovens Technical Conference, Conference Proceedings, Houston, TX, United States, Sep. 25-28, 2006.

Srivatsan, S. et al., "*Novel Polyolefin Resin for Elastic Spunbond & Melt Blown Applications*", INTC® 2004, Toronto, Canada, Sep. 20-23, 2004.

VISTAMAXX™ 2120 Propylene-based Elastomer, data sheets. <URL: www.specialtyelastomers.com>.

VISTAMAXX™ Specialty Elastomers for Meltblown Fabrics, data sheet. <URL: www.vistamaxxelastomers.com.

VISTAMAXX™ Specialty Elastomers VM2320, data sheet. <URL: www.vistamaxxelastomers.com.

VISTAMAXX™ Specialty Elastomers for Spunbond Fabrics, data sheet. URL: www.vistamaxxelastomers.com.

VISTAMAXX™ Specialty Elastomers—Unlimited Creative Potential. Imagine That! URL: www.vistamaxxelastomers.com.

Wheeler, L.M. et al., "*Gel Permeation Chromatography/Fourier Transform Infrared Interface for Polymer Analysis*", Applied Spectroscopy, vol. 47, No. 8, pp. 1128-1130 (1993).

* cited by examiner

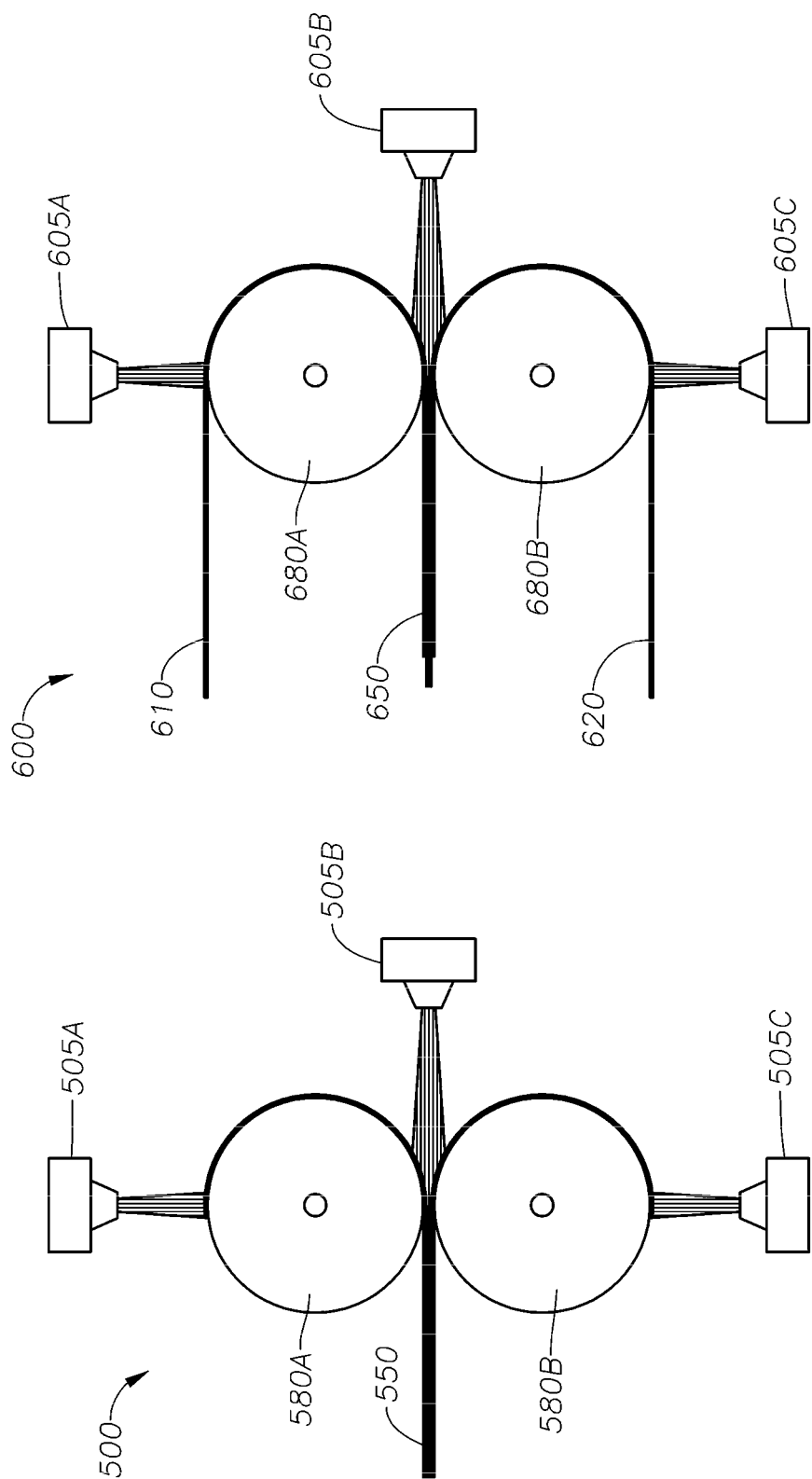

MULTI-LAYERED MELTBLOWN COMPOSITE AND METHODS FOR MAKING SAME

CROSS-REFERENCE TO RELATED APPLICATIONS

This application claims the priority and benefit of Provisional Application No. 61/248,254, filed Oct. 2, 2009, and Provisional Application No. 61/264,009, filed Nov. 24, 2009, the disclosures of which are incorporated herein by reference in their entireties. The present application is related to U.S. Ser. No. 12/271,526, filed Nov. 14, 2008, U.S. Ser. No. 61/101,341, filed Sep. 30, 2008, U.S. Ser. No. 61/157,524, filed Mar. 4, 2009, U.S. Ser. No. 12/566,564, filed Sep. 24, 2009, U.S. Ser. No. 12/566,410, filed Sep. 24,2009, U.S. Ser. No. 12/566,434, filed Sep. 24, 2009, U.S. Ser. No. 12/723,317, filed Mar. 11, 2010, U.S. Ser. No. 12/723,336, filed Mar. 11, 2010, and U.S. Ser. No. 12/746,642, filed Mar. 18, 2010, all of which are incorporated by reference in their entireties.

FIELD OF THE INVENTION

Embodiments provided herein generally relate to multilayer nonwoven fabrics and methods for making the same. More particularly, embodiments provided herein relate to multi-layered, meltblown composite structures having elastic core layers and aesthetically pleasing facing layers suitable for use in elastic articles and methods for making same.

BACKGROUND OF THE INVENTION

Description of the Related Art

Elastomers are useful as elastic nonwovens or films in applications ranging from waistbands, side panels, closure systems, and chasses for baby diapers, adult incontinence and personal hygiene garments, as well as other applications. Most of these elastic closures are constructed with facing layers that include a nonwoven substrate that is plastic in properties and provides aesthetic attributes such as touch and feel. Examples of such include those disclosed in U.S. Patent Application Publication No. 2008/0045917 and its counterparts. The plastic facing layers sandwich the elastic (core) layer, which is inherently elastomeric and possesses a rubbery feel that is not desirable for skin contact.

More recently, highly elastic, breathable, nonwoven fabric with the necessary aesthetic qualities that require no form of mechanical activation have been desired. Existing products are complex laminates of an elastic film, and are typically a styrenic block copolymer ("SBC") or polyurethane as the elastic film that can have polyolefin skins coextruded onto the film to prevent blocking, and nonwovens in order to provide the correct aesthetic (a soft, fluffy, cushion-like texture) and in certain constructions a hot melt glue layer to bond the nonwoven to either side of the elastic film. These types of constructions, once formed, are often not elastic due to the constraining influence of the inelastic components such as the polyolefin skin layers, adhesive, and nonwoven facing layers.

In order to remove the constraining influence of non-elastic elements, many composites require a mechanical stretching or activation process in order to stretch or break the non-elastic components. The mechanical stretching removes the constraints and creates an elastic composite controlled by the SBC film. Furthermore, such composites require the film to be apertured or perforated to make these laminates breathable. This process involves the controlled puncturing/tearing of the film with the associated concerns for film failure and increased scrap rates.

Work in this area has been discussed in U.S. Pat. Nos. 5,272,003, 5,366,782, 6,075,179, 6,342,565, 7,026,404; U.S. Patent Application Publication No(s). 2008/0199673, 2008/0182116, 2008/0182940, 2008/0182468, 2006/0172647, 2005/0130544, 2005/0106978; and WO 2008/094337. There is still a need, however, for new fabrics and methods for making the same that can provide different performance attributes in a single fabric without activation processes being essential for product performance.

SUMMARY OF THE INVENTION

Multilayer meltblown composites, articles made therefrom, and methods for making same are provided. In at least one specific embodiment, the multilayer meltblown composite includes: a first meltblown layer comprising one or more resins having an Ultimate Elongation (UE) of from about 50% to about 250%, as measured according to ASTM D412; a second meltblown layer comprising one or more resins having an Ultimate Elongation (UE) of 200% or more, as measured according to ASTM D412; and a third meltblown layer comprising one or more resins having an Ultimate Elongation (UE) of from about 50% to about 250%, as measured according to ASTM D412. Preferably, each resin has a MFR of about 2,000 dg/min or less, as measured by ASTM D1238, 2.16 kg, 230° C., and at least one of the first, second, and third meltblown layers comprises a propylene-α-olefin copolymer having a heat of fusion of 75 J/g or less.

In at least one specific embodiment, the method for making the multilayer meltblown composite comprises meltblowing a first material to form a first meltblown layer; meltblowing a second material to form a second meltblown layer; and meltblowing a third material to form a third meltblown layer, wherein each material is the same or different, each material includes at least one resin having a MFR of about 2,000 dg/min or less, as measured by ASTM D1238, 2.16 kg, 230° C., and at least one of the first, second, and third materials comprises an elastomer having an Ultimate Elongation (UE) of 200% or more, as measured according to ASTM D412.

BRIEF DESCRIPTION OF THE DRAWINGS

So that the recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 depicts a schematic of another illustrative meltblowing system for making a multilayer meltblown composite, according to one or more embodiments described. As depicted, the collection surfaces can be vertically disposed and the dies can be arranged anywhere about the collection surfaces.

FIG. 6 depicts a schematic of yet another illustrative meltblowing system for making a multilayer meltblown composite, according to one or more embodiments described. As depicted, the collection surfaces can be vertically disposed and the dies can be arranged anywhere about the collection surfaces. One or more facing layers can also be introduced to collection surfaces and fibers meltblown thereon.

DETAILED DESCRIPTION

Figure 1:
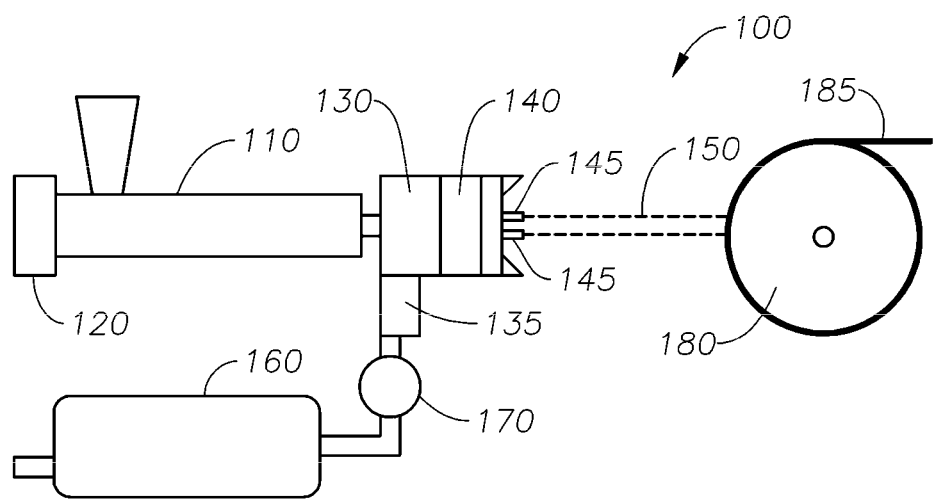
FIG. 1 depicts a schematic view of an illustrative meltblowing system for making a multilayer meltblown composite, according to one or more embodiments described.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this disclosure is combined with available information and technology.

The multilayer composite ("multilayer laminate") can include at least three meltblown layers made in-situ. Each meltblown layer can include one or more resins that are the same or different. Each resin can be an extensible resin, an elastic resin, or an inelastic resin. Suitable resins for any given layer can also be a blend of two or more resins, where each resin in extensible, inelastic, or elastic, such that the resulting blend can be extensible, inelastic, or elastic depending on the chosen resins, and their relatives amounts.

Preferably, the meltblown layers are disposed adjacent to one another. It is envisaged, however, that one or more spunlace, spunbond, spunlaid, in-situ entangled laminate layers, textiles, air laid, pulp, woven, super-absorbent polymer(s) ("SAP"), or films can be disposed on or between the meltblown layers.

As used herein, a "composite" or "fabric" is a structure, preferably flat but bendable and otherwise formable, having a thickness such that it impedes, but does not stop, the passage of air, the structure made from fibers that are bound together through chemical bonding, melt adhesion or weaving (mechanical linkage) such that they form the structure. As used herein, a "fiber" is a material whose length is very much greater than its diameter or breadth: the average diameter is on the order of 5 to 250 µm, and includes natural and/or synthetic substances.

As used herein, materials, resins, fibers, and/or fabrics referred to as being "elastic" are those that can recover at least 70% after 100% deformation. As used herein, materials, resins, fibers, and/or fabrics referred to as being "inelastic" are those that can recover less than 20% after 100% deformation. As used herein, materials, resins, fibers, and/or fabrics referred to as being "extensible" are those that can recover 20% to 70% after 100% deformation, as determined by ASTM D412. Extensible materials and fabrics are well known in the art and are those formed, in one instance, from a material that is extensible or by mechanically distorting or twisting a fabric (natural or synthetic) such as described in U.S. Pat. No. 5,523,141.

Suitable resins can be or include cellulosics, nylons, polyacetals, polyalkylene naphthalates, polyesters, co-polyesters, polyurethane, polyamids, polyamides, polyolefins, polyolefin homopolymers, polyolefin copolymers, acrylic, and blends thereof. Except as stated otherwise, the term "copolymer" means a polymer derived from two or more monomers (including terpolymers, tetrapolymers, etc. that can be arranged in a random, block, or grafted distribution), and the term "polymer" refers to any carbon-containing compound having repeat units from one or more different monomers.

Preferred cellulosic materials include rayon and viscose.

A preferred polyacetal is polyoxymethylene copolymer. Preferred polyesters include polyolefin-terephthalates and polyalkylene terephthalates, such as poly(ethylene terephthalate) (PET), poly(butylene terephthalate) (PBT), and poly(cyclohexane dimethylene terephthalate) (PCT).

Preferred polyolefins can be prepared from mono-olefin monomers including, but not limited to, monomers having 2 to 8 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Other suitable polyolefins can include one or more propylene homopolymers (100 wt % propylene-derived units), propylene copolymers, propylene-α-olefin copolymers, polypropylene impact copolymers (ICP), random copolymers (RCP) linear low density polyethylene, high density polyethylene, low density polyethylene, ethylene block copolymers (e.g., Infuse™ olefin block copolymers), styrenic block copolymers (e.g., Kraton™ styrenic copolymers), ethylene vinylacetates, urethanes, polyesters, and blends thereof. Certain specific extensible resins can include polyacrylonitrile, polybutylene terephthalate, polyethylene terephthalate (PET), polycyclohexylenedimethylene terephthalate (PCT), polyamide and/or acrylic.

As used herein, "polypropylene" refers to a propylene homopolymer, or a copolymer of propylene, or some mixture of propylene homopolymers and copolymers. In certain embodiments, the polypropylene described herein is predominately crystalline, thus the polypropylene may have a melting point ($T_m$) greater than 110° C. or 115° C. or 130° C. The term "crystalline," as used herein, characterizes those polymers which possess high degrees of inter- and intra-molecular order. In certain embodiments the polypropylene has a heat of fusion ($H_f$) greater than 60 J/g or 70 J/g or 80 J/g, as determined by DSC analysis. The heat of fusion is dependent on the composition of the polypropylene; the thermal energy for the highest order of polypropylene is estimated at 189 J/g that is, 100% crystallinity is equal to a heat of fusion of 189 J/g. A polypropylene homopolymer will have a higher heat of fusion than a copolymer or blend of homopolymer and copolymer.

In certain embodiments, the polypropylene(s) can be isotactic. Isotacticity of the propylene sequences in the polypropylenes can be achieved by polymerization with the choice of a desirable catalyst composition. The isotacticity of the polypropylenes as measured by $^{13}$C NMR, and expressed as a meso diad content is greater than 90% (meso diads [m]>0.90) or 95% or 97% or 98% in certain embodiments, determined as in U.S. Pat. No. 4,950,720 by $^{13}$C NMR. Expressed another way, the isotacticity of the polypropylenes as measured by $^{13}$C NMR, and expressed as a pentad content, is greater than 93% or 95% or 97% in certain embodiments.

The polypropylene can vary widely in composition. For example, substantially isotactic polypropylene homopolymer or propylene copolymer containing equal to or less than 10 wt % of other monomer, that is, at least 90 wt % by weight propylene can be used. Further, the polypropylene can be present in the form of a graft or block copolymer, in which the blocks of polypropylene have substantially the same stereoregularity as the propylene-α-olefin copolymer (described below) so long as the graft or block copolymer has a sharp melting point above 110° C. or 115° C. or 130° C., characteristic of the stereoregular propylene sequences.

The polypropylene can be a combination of homopolypropylene, and/or random, and/or block copolymers as described herein. When the polypropylene is a random copolymer, the percentage of the α-olefin derived units in the copolymer is, in general, up to 5% by weight of the polypropylene, 0.5% to 5% by weight in another embodiment, and 1% to 4% by weight in yet another embodiment. The preferred comonomer derived from ethylene or α-olefins containing 4 to 12 carbon atoms. One, two or more comonomers can be copolymerized with propylene. Exemplary α-olefins may be selected from the group consisting of ethylene; 1-butene; 1-pentene-2-methyl-1-pentene-3-methyl-1-butene; 1-hexene-3-methyl-1-pentene-4-methyl-1-pentene-3,3-dimethyl-1-butene; 1-heptene; 1-hexene; 1-methyl-1-hexene; dimethyl-1-pentene; trimethyl-1-butene; ethyl-1-pentene; 1-octene; methyl-1-pentene; dimethyl-1-hexene; trimethyl-1-pentene; ethyl-1-hexene; 1-methylethyl-1-pentene; 1-diethyl-1-butene; propyl-1-pentene; 1-decene; methyl-1-nonene; 1-nonene; dimethyl-1-octene; trimethyl-1-heptene; ethyl-1-octene; methylethyl-1-butene; diethyl-1-hexene; 1-dodecene and 1-hexadodecene.

The weight average molecular weight (Mw) of the polypropylene can be between 50,000 g/mol to 3,000,000 g/mol, or from 90,000 g/mol to 500,000 g/mol in another embodiment, with a molecular weight distribution (MWD, Mw/Mn) within the range from 1.5 to 2.5; or 3.0 to 4.0; or 5.0 to 20.0. The polypropylene can have an MFR (2.16 kg/230° C.) ranging of from 10 dg/min to 15 dg/min; or 18 dg/min to 30 dg/min; or 35 dg/min to 45 dg/min; or 40 dg/min to 50 dg/min.

The term "random polypropylene" ("RCP") as used herein broadly means a single phase copolymer of propylene having up to 9 wt %, preferably 2 to 8 wt % of an alpha olefin comonomer. Preferred alpha olefin comonomers have 2 carbon atoms, or from 4 to 12 carbon atoms. Preferably, the alpha olefin comonomer is ethylene.

The propylene impact copolymers ("ICP") is heterogeneous and can include a first phase of 70 to 95 wt % homopolypropylene and a second phase of from 5 to 30 wt % ethylene-propylene rubber, based on the total weight of the impact copolymer. The propylene impact copolymer can include 78 to 95 wt % homopolypropylene and from 5 to 22 wt % ethylene-propylene rubber, based on the total weight of the impact copolymer. In certain embodiments, the propylene-based polymer can include from 90 to 95 wt % homopolypropylene and from 5 to 10 wt % ethylene-propylene rubber, based on the total weight of the impact copolymer.

There is no particular limitation on the method for preparing the polypropylenes described herein. However, for example, the polymer is a propylene homopolymer obtained by homopolymerization of propylene in a single stage or multiple stage reactor. Copolymers may be obtained by copolymerizing propylene and ethylene or an α-olefin having from 4 to 20 carbon atoms in a single stage or multiple stage reactor. Polymerization methods include, but are not limited to, high pressure, slurry, gas, bulk, or solution phase, or a combination thereof, using any suitable catalyst such as traditional Ziegler-Natta catalyst or a single-site, metallocene catalyst system, or combinations thereof including bimetallic (i.e., Ziegler-Natta and metallocene) supported catalyst systems.

Exemplary commercial polypropylenes include the family of ACHIEVE™ polymers (ExxonMobil Chemical Company, Baytown, TX). The ACHIEVE™ polymers are produced using metallocene catalyst systems. In certain embodiments, the metallocene catalyst system produces a narrow molecular weight distribution polymer. The MWD is typically in the range of 1.5 to 2.5. However, a broader MWD polymer may be produced in a process with multiple reactors. Different MW polymers can be produced in each reactor to broaden the MWD. ACHIEVE™ polymer such as ACHIEVE™ 3854, a homopolymer having an MFR of 24 dg/min can be used as a blend component described herein. Alternatively, an ACHIEVE™ polymer such as ACHIEVE™ 6936G1, a 1550 dg/min MFR homopolymer, can be used as a blend component described herein. Other polypropylene random copolymer and impact copolymer may also be used. The choice of polypropylene MFR can be used as means of adjusting the final MFR of the blend, especially the facing layer composition. Any of the polypropylenes described herein can be modified by controlled rheology to improve spinning performance as is known in the art.

The "propylene-α-olefin copolymer" is a copolymer of propylene-derived units and one or more units derived from ethylene or a $C_4$-$C_{10}$ α-olefin and optionally one or more diene-derived units, and are relatively elastic and/or form nonwoven fibers and fabrics that are elastic (Ultimate Elongation from greater than 500%). The overall comonomer content of the copolymer is within the range from 5 to 35 wt % in one embodiment. In some embodiments, where more than one comonomer is present, the amount of a particular comonomer may be less than 5 wt %, but the combined comonomer content is from greater than 5 wt %. The propylene-α-olefin copolymers may be described by any number of different parameters, and those parameters may include a numerical range made up of any desirable upper limit with any desirable lower limit as described herein for the propylene-α-olefin copolymers.

The propylene-α-olefin copolymer may be a terpolymer of propylene, block copolymer (the comonomer-derived units occur along long sequences), impact copolymer of propylene, random polypropylene, random copolymer (the comonomer-derived units are randomly distributed along the polymer backbone), or mixtures thereof. The presence of randomness or "blocky-ness" in a copolymer can be determined by $^{13}C$ NMR as is known in the art and described in, for example, 18 J. Poly. Sci.: Poly. Lett. Ed. (1980), pp. 389-394.

In certain embodiments, the propylene-α-olefin copolymer can include ethylene or $C_4$-$C_{10}$ α-olefin-derived units (or "comonomer-derived units") within the range from 5 or 7 or 8 or 10 to 18 or 20 or 25 or 32 or 35 wt % by weight of the copolymer. The propylene-α-olefin copolymer may also include two different comonomer-derived units. Also, these copolymers and terpolymers may include diene-derived units as described below. In a particular embodiment, the propylene-α-olefin copolymer includes propylene-derived units and comonomer units selected from ethylene, 1-butene, 1-hexene, and 1-octene. And in a more particular embodiment, the comonomer is ethylene, and thus the propylene-α-olefin copolymer is a propylene-ethylene copolymer.

In one embodiment, the propylene-α-olefin copolymer includes from less than 10 or 8 or 5 or 3 wt %, by weight of the copolymer, of diene derived units (or "diene"), and within the range from 0.1 or 0.5 or 1 to 5 or 8 or 10 wt % in yet another embodiment. Suitable dienes include for example: 1,4-hexadiene, 1,6-octadiene, 5-methyl-1,4-hexadiene, 3,7-dimethyl-1,6-octadiene, dicyclopentadiene (DCPD), ethylidiene norbornene (ENB), norbornadiene, 5-vinyl-2-norbornene (VNB), and combinations thereof. The diene, if present, is most preferably ENB.

In certain embodiments, the propylene-α-olefin copolymers have a triad tacticity of three propylene units, as measured by $^{13}C$ NMR, from greater than 75% or 80% or 82% or 85% or 90%. In one embodiment, the triad tacticity is within the range from 50 to 99%, and from 60 to 99% in another embodiment, and from 75 to 99% in yet another embodiment, and from 80 to 99% in yet another embodiment; and from 60 to 97% in yet another embodiment. Triad tacticity is determined as follows: The tacticity index, expressed herein as "m/r", is determined by $^{13}C$ NMR. The tacticity index m/r is calculated as defined by Cheng, H. N., "$^{13}C$ NMR Analysis of Ethylene-Propylene Rubbers", Macromolecules, Vol. 17 (1984), pp. 1950-1955. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios from greater than 50. Embodiments of the propylene-α-olefin copolymer have a tacticity index m/r within the range from 4 or 6 or 8 or 10 or 12.

In certain embodiments, the propylene-α-olefin copolymers have a heat of fusion ($H_f$), determined according to the Differential Scanning calorimetry (DSC) procedure described herein, within the range from 0.5 or 1 or 5 J/g, to 35 or 40 or 50 or 65 or 75 J/g. In certain embodiments, the $H_f$ value is from less than 75 or 65 or 55 J/g.

In certain embodiments, the propylene-α-olefin copolymers have a percent crystallinity within the range from 0.5 to 40%, and from 1 to 30% in another embodiment, and from 5 to 25% in yet another embodiment, wherein "percent crystallinity" is determined according to the DSC procedure described herein. (The thermal energy for the highest order of polypropylene is estimated at 189 J/g (i.e., 100% crystallinity is equal to 189 J/g)). In another embodiment, the propylene-α-olefin copolymer has a percent crystallinity from less than 40% or 25% or 22% or 20%.

In certain embodiments, the propylene-α-olefin copolymers have a single peak melting transition as determined by DSC; in certain embodiments the propylene-α-olefin copolymer has a primary peak melting transition from less than 90° C., with a broad end-of-melt transition from greater than about 110° C. The peak "melting point" ($T_m$) is defined as the temperature of the greatest heat absorption within the range of melting of the sample. However, the propylene-α-olefin copolymer may show secondary melting peaks adjacent to the principal peak, and/or the end-of-melt transition, but for purposes herein, such secondary melting peaks are considered together as a single melting point, with the highest of these peaks being considered the $T_m$ of the propylene-α-olefin copolymer. The propylene-α-olefin copolymers have a peak melting temperature ($T_m$) from less than 70 or 80 or 90 or 100 or 105° C. in certain embodiments; and within the range from 10 or 15 or 20 or 25 to 65 or 75 or 80 or 95 or 105° C. in other embodiments.

The procedure for DSC determinations is as follows. About 0.5 grams of polymer is weighed out and pressed to a thickness of about 15-20 mils (about 381-508 microns) at about 140° C.-150° C., using a "DSC mold" and Mylar™ as a backing sheet. The pressed pad is allowed to cool to ambient temperature by hanging in air (the Mylar was not removed). The pressed pad is annealed at room temperature (about 23-25° C.) for about 8 days. At the end of this period, an about 15-20 mg disc is removed from the pressed pad using a punch die and placed in a 10 microliter aluminum sample pan. The sample is placed in a differential scanning calorimeter (Perkin Elmer Pyris 1 Thermal Analysis System) and cooled to about −100° C. The sample is heated at about 10° C./min to attain a final temperature of about 165° C. The thermal output, recorded as the area under the melting peak of the sample, is a measure of the heat of fusion and can be expressed in Joules per gram (J/g) of polymer and automatically calculated by the Perkin Elmer System. Under these conditions, the melting profile shows two (2) maxima, the maxima at the highest temperature was taken as the melting point within the range of melting of the sample relative to a baseline measurement for the increasing heat capacity of the polymer as a function of temperature.

In certain embodiments, the propylene-α-olefin copolymers have a density within the range from 0.840 g/cm$^3$ to 0.920 g/cm$^3$, and from 0.845 g/cm$^3$ to 0.900 g/cm$^3$ in another embodiment, and from 0.850 g/cm$^3$ to 0.890 g/cm$^3$ in yet another embodiment, the values measured at room temperature per the ASTM D-1505 test method.

In certain embodiments, the propylene-α-olefin copolymers have a Shore A hardness (ASTM D2240) within the range from 10 or 20 to 80 or 90 Shore A. In yet another embodiment, the propylene-α-olefin copolymers possess an Ultimate Elongation (ASTM-D412) greater than 500%, 1,000% or 2,000%. The propylene-α-olefin copolymers can also have an Ultimate Elongation (ASTM-D412) ranging from a low of about 300%, 400%, or 500% to a high of about 800%, 1,200%, 1,800%, 2,000%, or 3,000%.

In certain embodiments, the propylene-α-olefin copolymers have a weight average molecular weight (Mw) value within the range from 20,000 to 5,000,000 g/mole, and from 50,000 to 1,000,000 g/mole in another embodiment, and from 70,000 to 400,000 g/mole in yet another embodiment. In another embodiment, the propylene-α-olefin copolymers have a number average molecular weight (Mn) value within the range from 4,500 to 2,500,000 g/mole, and from 20,000 to 250,000 g/mole in yet another embodiment, and from 50,000 to 200,000 g/mole in yet another embodiment. In yet another embodiment, the propylene-α-olefin copolymers have a z-average molecular weight (Mz) value within the range from 20,000 to 7,000,000 g/mole, and from 100,000 to 700,000 g/mole in another embodiment, and from 140,000 to 500,000 g/mole in yet another embodiment.

In certain embodiments, a desirable molecular weight (and hence, a desirable MFR) is achieved by visbreaking the propylene-α-olefin copolymers. The "visbroken propylene-α-olefin copolymers" (also known in the art as "controlled rheology" or "CR") is a copolymer that has been treated with a visbreaking agent such that the agent breaks apart the polymer chains. Non-limiting examples of visbreaking agents include peroxides, hydroxylamine esters, and other oxidizing and free-radical generating agents. Stated another way, the visbroken copolymer may be the reaction product of a visbreaking agent and the copolymer. In particular, a visbroken propylene-α-olefin copolymer is one that has been treated with a visbreaking agent such that its MFR is increased, in one embodiment by at least 10%, and at least 20% in another embodiment relative to the MFR value prior to treatment.

In certain embodiments, the molecular weight distribution (MWD) of the propylene-α-olefin copolymers is within the range from 1.5 or 1.8 or 2.0 to 3.0 or 3.5 or 4.0 or 5.0 or 10.0 in particular embodiments. Techniques for determining the molecular weight (Mn, Mz and Mw) and molecular weight distribution (MWD) are as follows, and as by Ver Strate et al., "*Near Monodisperse Ethylene-Propylene Copolymers by Direct Ziegler-Natta Polymerization. Preparation, Characterization, Properties,*" Vol. 21, Macromolecules (1988), pp. 3360-3371. Conditions described herein govern over published test conditions. Molecular weight and molecular weight distribution are measured using a Waters 150 gel permeation chromatograph equipped with a Chromatix KMX-6 on-line light scattering photometer. The system was used at 135° C. with 1,2,4-trichlorobenzene as the mobile phase. Showdex™ (Showa-Denko America, Inc.) polystyrene gel columns 802, 803, 804 and 805 are used. This technique is discussed in Rooney, J. G. et al., "*On Line Determination by Light Scattering of Mechanical Degradation in the GPC Process,*" Liquid Chromatography of Polymers and Related Materials III, J. Cazes ed., Marcel Dekker (1981), pp. 207-235. No corrections for column spreading were employed; however, data on generally accepted standards, for example, National Bureau of Standards, Polyethylene (SRM 1484) and anionically produced hydrogenated polyisoprenes (an alternating ethylene-propylene copolymer) demonstrate that such corrections on Mw/Mn or Mz/Mw are less than 0.05 units. Mw/Mn was calculated from an elution time-molecular weight relationship whereas Mz/Mw was evaluated using the light scattering photometer. The numerical analyses can be performed using the commercially available computer software GPC2, MOLWT2 available from LDC/Milton Roy-Riviera Beach, Fla.

The propylene-α-olefin copolymers described herein can be produced using any catalyst and/or process known for producing polypropylenes. In certain embodiments, the propylene-α-olefin copolymers can include copolymers prepared according to the procedures in WO 02/36651, U.S. Pat. No. 6,992,158, and/or WO 00/01745. Preferred methods for producing the propylene-α-olefin copolymers are found in U.S. Patent Application Publication No. 2004/0236042 and U.S. Pat. No. 6,881,800. Preferred propylene-based polyolefin polymers are available commercially under the trade names VISTAMAXX™ (ExxonMobil Chemical Company, Houston, Tex., USA) and VERSIFY™ (The Dow Chemical Company, Midland, Mich., USA), certain grades of TAFMER™ XM or NOTIO™ (Mitsui Company, Japan), certain grades of LMPO™ from Idemitsu, or certain grades of SOFTELL™ (Lyondell Basell Polyolefine GmbH, Germany). A commercial example of an ethylene-based polyolefin block copolymer is INFUSE™ olefin block copolymers from Dow Chemical.

In one or more embodiments, the meltblown resin can be or include natural rubber (NR), synthetic polyisoprene (IR), butyl rubber (copolymer of isobutylene and isoprene, IIR), halogenated butyl rubbers (chloro-butyl rubber (CIIR); bromo-butyl rubber (BIIR)), polybutadiene (BR), styrene-butadiene rubber (SBR), SEBS block copolymers, SIS block copolymers, SBS block copolymers, ethylene-octene block copolymers, ethylene-octene copolymers, ethylene-hexene copolymers, ethylene-butene copolymers, nitrile rubber, hydrogenated nitrile rubbers, chloroprene rubber (CR), polychloroprene, neoprene, EPM (ethylene-propylene rubber) and EPDM rubbers (ethylene-propylene-diene rubber), epichlorohydrin rubber (ECO), polyacrylic rubber (ACM, ABR), silicone rubber, fluorosilicone rubber, fluoroelastomers, perfluoroelastomers, polyether block amides (PEBA), chlorosulfonated polyethylene (CSM), ethylene-vinyl acetate (EVA), thermoplastic elastomers (TPE), thermoplastic vulcanizates (TPV), thermoplastic polyurethane (TPU), thermoplastic olefins (TPO), polysulfide rubber, or blends of any two or more of these elastomers. In at least one specific embodiment, the elastic resin is or includes one or more polyolefin polymers. The term "polyolefin polymers" refers to homopolymers or copolymers of α-olefins having less than 40% crystallinity, or a heat of fusion ($H_f$) of less than 75 J/g.

In certain embodiments, the meltblown resin can be or include one or more metallocene polyethylenes ("mPE's"), including one or more mPE homopolymers or copolymers. The mPE homopolymers or copolymers may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Baytown, Tex. under the tradename EXACT™. For more information on the methods and catalysts/activators to produce such mPE homopolymers and copolymers see PCT Patent Application Publication No(s). WO 94/26816, WO 92/00333, WO 91/09882, WO 94/03506 and WO 94/03506; EP No(s). 0 277 003, 0 129 368, 0 520 732, 0 426 637, 0 573 403, 0 520 732, 0 495 375, 0 500 944, 0 570982 and 0 277004; U.S. Pat. Nos. 5,153,157, 5,198,401, 5,240,894, 5,324,800, 5,264,405, 5,096,867, 5,507,475, 5,055,438 and 5,017,714; and Canadian Patent No. 1,268,753.

In certain embodiments, the meltblown resin can be or include one or more termonomers and tetramonomers which may be one or more $C_3$ to $C_{20}$ olefins, any $C_4$ to $C_{20}$ linear, cyclic or branched dienes or trienes and any styrenic monomers such as styrene, alpha-methyl styrene, or para-methyl styrene. Preferred examples include butadiene, pentadiene, cyclopentadiene, hexadiene, cyclohexadiene, heptadiene, octadiene, nonadiene, norbornene, vinyl norbornene, ethylidene norbornene, isoprene and heptadiene.

The $C_3$ to $C_{20}$ and $C_4$ to $C_{20}$ olefins can be any polymerizable olefin monomer and are preferably a linear, branched or cyclic olefin, even more preferably an alpha-olefin. Examples of suitable olefins include propylene, butene, isobutylene, pentene, isopentene, cyclopentene, hexene, isohexene, cyclohexene, heptene, isoheptene, cycloheptene, octene, isooctene, cyclooctene, nonene, cyclononene, decene, isodecene, dodecene, isodecene, 4-methyl-pentene-1, 3-methyl-pentene-1, 3,5,5-trimethyl hexene-1. Suitable comonomers also include dienes, trienes, and styrenic monomers. Preferred examples include styrene, alpha-methyl styrene, para-alkyl styrene (such as para-methyl styrene), hexadiene, norbornene, vinyl norbornene, ethylidene norbornene, butadiene, isoprene, heptadiene, octadiene, and cyclopentadiene. Preferred comonomers for the copolymer of ethylene are propylene, butene, hexene and/or octene.

In certain embodiments, the meltblown resin can include one or more polyalphaolefins (PAOs). PAOs are high purity hydrocarbons, with a fully paraffinic structure and a high degree of branching. Suitable PAOs are liquids with a pour point of $-10°$ C. or less and a kinematic viscosity at $100°$ C. (KV$100°$ C.) of 3 cSt or more. Such PAOs can include $C_{15}$ to $C_{1500}$ (preferably $C_{20}$ to $C_{1000}$, preferably $C_{30}$ to $C_{800}$, preferably $C_{35}$ to $C_{400}$, most preferably $C_{40}$ to $C_{250}$) oligomers (such as dimers, trimers, etc) of $C_3$ to $C_{24}$ (preferably $C_5$ to $C_{18}$, preferably $C_6$ to $C_{14}$, preferably $C_8$ to $C_{12}$) alpha-olefins, preferably linear alpha-olefins (LAOs), provided that $C_3$ and $C_4$ alpha-olefins are present at 30 wt % or less (preferably 20 wt % or less, preferably 10 wt % or less, preferably 5 wt % or less). Suitable LAOs include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and blends thereof.

In one or more embodiments, a single LAO is used to prepare the oligomers. A preferred embodiment involves the oligomerization of 1-octene or 1-decene, preferably 1-decene. In one or more embodiments, the PAO is or includes oligomers of two or more $C_3$ to $C_{18}$ LAOS, to make 'bipolymer' or 'terpolymer' or higher-order copolymer combinations, provided that $C_3$ and $C_4$ LAOs are present 30 wt % or less (preferably 20 wt % or less, preferably 10 wt % or less, preferably 5 wt % or less). A preferred embodiment involves oligomerization of a mixture of LAOs selected from $C_6$ to $C_{18}$ LAOs with even carbon numbers. Another preferred embodiment involves oligomerization of 1-octene, 1-decene, and 1-dodecene.

In one or more embodiments, the PAO comprises oligomers of a single alpha-olefin species having a carbon number of 5 to 24 (preferably 6 to 18, more preferably 8 to 12, most preferably 10). In one or more embodiments, the PAO comprises oligomers of mixed alpha-olefins (i.e., two or more alpha-olefin species), each alpha-olefin having a carbon number of 5 to 24 (preferably 6 to 18, preferably 8 to 12). In one or more embodiments, the PAO comprises oligomers of mixed alpha-olefins (i.e., involving two or more alpha-olefin species) where the weighted average carbon number for the alpha-olefin mixture is 6 to 14 (preferably 8 to 12, preferably 9 to 11).

In one or more embodiments, the PAO or blend of PAOs has a number-average molecular weight ($M_n$) of from 400 to 15,000 g/mol (preferably 400 to 12,000 g/mol, preferably 500 to 10,000 g/mol, preferably 600 to 8,000 g/mol, preferably 800 to 6,000 g/mol, preferably 1,000 to 5,000 g/mol). In one or more embodiments, the PAO or blend of PAOs has a $M_n$ greater than 1,000 g/mol (preferably greater than 1,500 g/mol, preferably greater than 2,000 g/mol, preferably greater than 2,500 g/mol).

In one or more embodiments, the PAO or blend of PAOs has a KV$100°$ C. of 3 cSt or more (preferably 4 cSt or more, preferably 5 cSt or more, preferably 6 cSt or more, preferably 8 cSt or more, preferably 10 cSt or more, preferably 20 cSt or more, preferably 30 cSt or more, preferably 40 cSt or more, preferably 100 or more, preferably 150 cSt or more). In one or more embodiments, the PAO has a KV$100°$ C. of 3 to 3,000 cSt (preferably 4 to 1,000 cSt, preferably 6 to 300 cSt, preferably 8 to 150 cSt, preferably 8 to 100 cSt, preferably 8 to 40 cSt). In one or more embodiments, the PAO or blend of PAOs has a KV$100°$ C. of 10 to 1000 cSt (preferably 10 to 300 cSt, preferably 10 to 100 cSt). In yet another embodiment, the PAO or blend of PAOs has a KV$100°$ C. of 4 to 8 cSt. In yet another embodiment, the PAO or blend of PAOs has a KV$100°$ C. of 25 to 300 cSt (preferably 40 to 300 cSt, preferably 40 to 150 cSt). In one or more embodiments, the PAO or blend of PAOs has a KV$100°$ C. of 100 to 300 cSt.

In one or more embodiments, the PAO or blend of PAOs has a Viscosity Index (VI) of 120 or more (preferably 130 or more, preferably 140 or more, preferably 150 or more, preferably 170 or more, preferably 190 or more, preferably 200 or more, preferably 250 or more, preferably 300 or more). In one or more embodiments, the PAO or blend of PAOs has a VI of 120 to 350 (preferably 130 to 250).

In one or more embodiments, the PAO or blend of PAOs has a pour point of $-10°$ C. or less (preferably $-20°$ C. or less, preferably $-25°$ C. or less, preferably $-30°$ C. or less, preferably $-35°$ C. or less, preferably $-40°$ C. or less, preferably $-50°$ C. or less). In one or more embodiments, the PAO or blend of PAOs has a pour point of $-15$ to $-70°$ C. (preferably $-25$ to $-60°$ C.).

In one or more embodiments, the PAO or blend of PAOs has a glass transition temperature ($T_g$) of $-40°$ C. or less (preferably $-50°$ C. or less, preferably $-60°$ C. or less, preferably $-70°$ C. or less, preferably $-80°$ C. or less). In one or more embodiments, the PAO or blend of PAOs has a $T_g$ of $-50$ to $-120°$ C. (preferably $-60$ to $-100°$ C., preferably $-70$ to $-90°$ C.).

In one or more embodiments, the PAO or blend of PAOs has a flash point of $200°$ C. or more (preferably $210°$ C. or more, preferably $220°$ C. or more, preferably $230°$ C. or more), preferably between $240°$ C. and $290°$ C. In one or more embodiments, the PAO or blend of PAOs has a specific gravity (15.6° C.) of 0.86 or less (preferably 0.855 or less, preferably 0.85 or less, preferably 0.84 or less).

In one or more embodiments, the PAO or blend of PAOs has a molecular weight distribution ($M_w/M_n$) of 2 or more (preferably 2.5 or more, preferably 3 or more, preferably 4 or more, preferably 5 or more, preferably 6 or more, preferably 8 or more, preferably 10 or more). In one or more embodiments, the PAO or blend of PAOs has a $M_w/M_n$ of 5 or less (preferably 4 or less, preferably 3 or less) and a KV$100°$ C. of 10 cSt or more (preferably 20 cSt or more, preferably 40 cSt or more, preferably 60 cSt or more).

Desirable PAOs are commercially available as SPEC-TRASYN™ and SPECTRASYN ULTRA™ from Exxon-Mobil Chemical (USA). Other useful PAOs include those available as SYNFLUID™ from ChevronPhillips Chemical (USA), as DURASYN™from Innovene (USA), as NEX-BASE™ from Neste Oil (Finland), and as SYNTRON™ from Chemtura (USA). For PAOs, the percentage of carbons in chain-type paraffinic structures ($C_p$) is close to 100% (typically greater than 98% or even 99%). Additional details are described in, for example, U.S. Pat. No(s). 3,149,178; 4,827,064; 4,827,073; 5,171,908; and 5,783,531 and in Synthetic Lubricants and High-Performance Functional Fluids (Leslie R. Rudnick & Ronald L. Shubkin, eds. Marcel Dekker, Inc. 1999), pp. 3-52.

Additives

Any of the resins or layers can further include one or more additives. Suitable additives can include any one or more processing oils (aromatic, paraffinic and napthathenic mineral oils), compatibilizers, calcined clay, kaolin clay, nanoclay, talc, silicates, carbonates, sulfates, carbon black, sand, glass beads, mineral aggregates, wollastonite, mica, glass fiber, other filler, pigments, colorants, dyes, carbon black, filler, dispersants, flame retardants, antioxidants, conductive particles, UV-inhibitors, stabilizers, light stabilizer, light absorber, coupling agents including silanes and titanates, plasticizers, lubricants, blocking agents, antiblocking agents, antistatic agents, waxes, foaming agents, nucleating agents, slip agents, acid scavengers, lubricants, adjuvants, surfactants, crystallization aids, polymeric additives, defoamers, preservatives, thickeners, rheology modifiers, humectants, coagents, vulcanizing/cross-linking/curative agents, vulcanizing/cross-linking/curative accelerators, cure retarders and combinations thereof.

Process for Making Composite

The multilayer composite or fabric can be formed using any melt blowing process. Preferably, the multilayer composite is meltblown from an apparatus that can operate at a melt pressure from greater than 500 psi (3.45 MPa) and a melt temperature within the range of 100° C. to 350° C. and capable of making fibers as fine as 1 micron in average diameter.

FIG. 1 depicts a schematic view of an illustrative meltblowing system or arrangement 100 for making the multilayer meltblown composite, according to one or more embodiments. The system 100 includes at least one extruder 110, and may include a motor 120 to maintain melt pressure within the system 100. The extruder 110 can be coupled to at least one die block or array die 130 that is coupled to a spinneret portion or spinneret 140. The die block 130 is also coupled to at least one air manifold 135 for delivering high pressure air to the spinneret portion 140 of the die block 130. The spinneret 140 includes a plurality of spinning nozzles 145 through which the melt is extruded and simultaneously attenuated with air pressure to form filaments, or fibers 150. The spinning nozzles 145 are preferably circular, die capillaries. Preferably, the spinneret 140 has a nozzle density that ranges from 20, 30, or 40 holes/inch to 200, 250, or 320 holes/inch. In one embodiment, each nozzle 145 has an inside diameter ranging of from about 0.05 mm, 0.10 mm, or 0.20 mm to 0.80 mm, 0.90 mm, or 1.00 mm.

In the die spinneret 140, the molten threads or filaments converge with a hot, high velocity, gas stream (e.g., air or nitrogen) to attenuate the filaments of molten thermoplastic material to form the individual fibers 150. The temperature and flow rate of the attenuating gas stream can be controlled using a heat exchanger 160 and air valve 170. The diameters of the filaments can be reduced by the gas stream to a desired size. Thereafter, the meltblown fibers 150 are carried by the high velocity gas stream and are deposited on a collecting surface 180 to form at least one web 185 of randomly disbursed meltblown fibers. The collecting surface 180 can be an exterior surface of a vacuum drum, for example.

Figure 2:
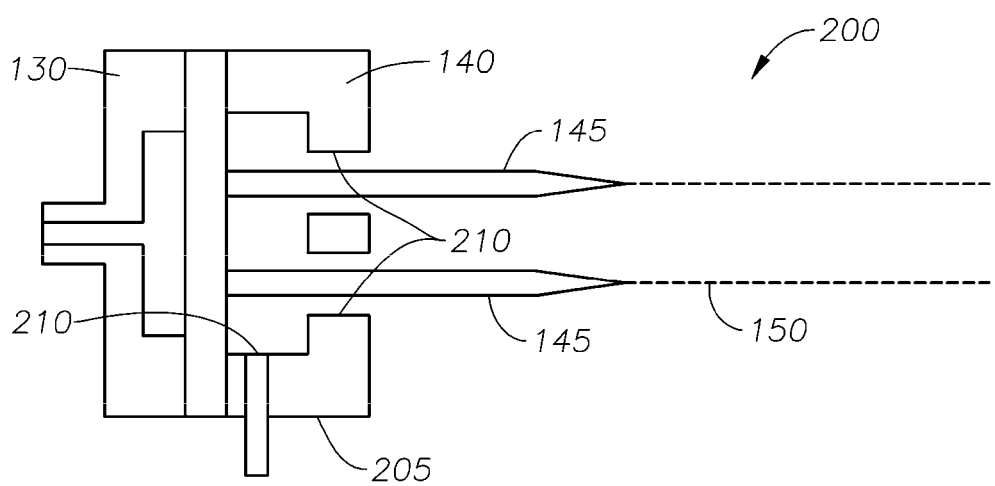
FIG. 2 depicts an enlarged schematic view of an illustrative die assembly, according to one or more embodiments described.

FIG. 2 depicts an enlarged schematic view of an illustrative die assembly 200, according to one or more embodiments. The die assembly 200 includes the die block 130 and the spinneret 140. As depicted, the air ("primary air") is provided through the primary air nozzle 210 located at least on a side of the die spinneret 140. The die block 130 can be heated using the primary air, a resistive heating element, or other known device or technique (not shown), to prevent the die block 130 from becoming clogged with solidifying polymer as the molten polymer exits and cools. The air also draws, or attenuates, the melt into fibers. Secondary, or quenching, air at temperatures above ambient can also be provided through the die block 130. Primary air flow rates typically range from about 1 to 30 standard cubic feet per minute per inch of die width (SCFM/inch). In certain embodiments, the primary air pressure in the meltblown process typically ranges from a low of about 2 psig, 3, psig, 5 psig, or 7 psig to about 10 psig, 15 psig, 20 psig, or 30 psig at a point in the die block 130 just prior to exit. Primary air temperatures are typically within the range from 150° C., 200° C., or 230° C. to 300° C., 320° C., or 350° C.

The melting temperature (Tm) of the resins can range from 50° C. to 300° C. In yet other embodiments, the melting temperature is at least 50° C. and less than 150° C., 200° C., 220° C., 230° C., 250° C., 260° C., 270° C., 280° C., 290° C., 300° C., 310° C., or 320° C. The resin can be formed into fibers at a melt pressure from greater than 500 psi (3.4 MPa) or 750 psi (5.2 MPa) or 1,000 psi (6.9 MPa) or 2,000 psi (17.3 MPa), or within the range from 500 psi (3.5 MPa) or 750 psi (5.2 MPa) to 1,000 psi (6.9 MPa) or 2,000 psi (13.8 MPa) or 2,500 psi (17.3 MPa).

Expressed in terms of the amount of composition flowing per inch of the die per unit of time, throughputs for the manufacture of meltblown fabrics using the compositions described herein are typically within the range from 0.1, 0.2, 0.3, or 0.5 to 1.0, 1.5, 2.0, or 3.0 grams per hole per minute (ghm). Thus, for a die having 30 holes per inch, polymer throughput is typically about 0.25, 0.5, or 1.0 to about 4, 8, or 12 lbs/inch/hour (PIH).

Because such high temperatures can be used, a substantial amount of heat is desirably removed from the fibers in order to quench, or solidify, the fibers leaving the nozzles. Although not shown, cold gases of air or nitrogen can be used to accelerate cooling and solidification of the meltblown fibers. In particular, cooling ("secondary") air flowing in a cross-flow direction (perpendicular or angled) relative to the direction of fiber elongation may be used to quench meltblown fibers. Also, an additional, cooler pressurized quench air may be used and can result in even faster cooling and solidification of the fibers. In certain embodiments, the secondary cold air flow may be used to attenuate the fibers. Through the control of air and array die temperatures, air pressure, and polymer feed rate, the diameter of the fiber formed during the meltblown process may be regulated.

Figure 3:
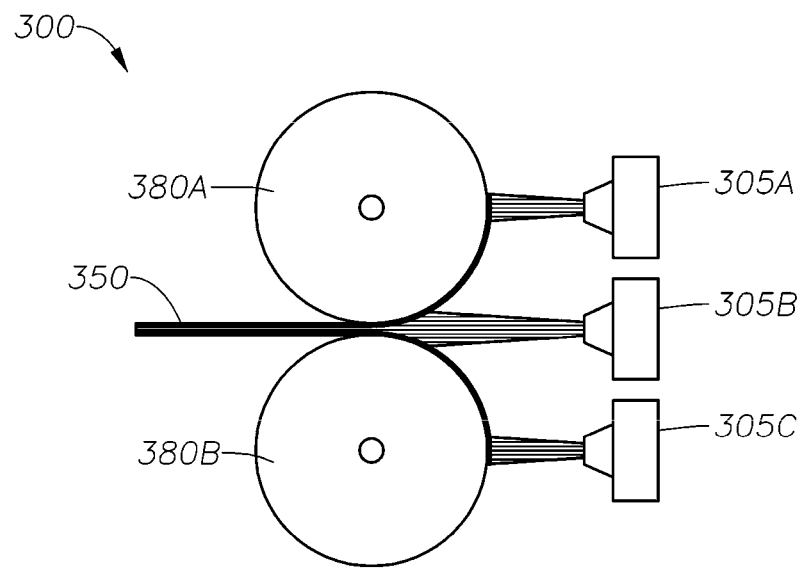
FIG. 3 depicts a schematic of an illustrative meltblowing system for making a multilayer meltblown composite, according to one or more embodiments described. As depicted, the dies and collection surfaces can be vertically disposed.

FIGS. 3 through 8 depict schematics of various illustrative meltblowing systems or arrangements that can be used to make the multi-layered composites described herein. FIG. 3, for example, depicts a schematic of an illustrative meltblowing system 300 for making a multilayer meltblown composite 350. The meltblowing system 300 can include three or more vertically arranged dies 305A, 305B, 305C. Each die 305A, 305B, 305C can be similar to the die 200 discussed and described above with reference to FIG. 2. Any resin or combination of resins can be blown through any given die 305A, 305B, 305C, where the first die 305A provides a first facing or first outer layer, the second die 305B provides a core layer or intermediate layer, and the third die 305C provides a second facing layer or second outer layer.

The meltblowing system 300 can further include two or more collection surfaces 380A, 380B that are vertically aligned. Each collection surface 380A, 380B can be similar to the collection drum 180 depicted and described above with reference to FIG. 1. The collection surfaces 380A, 380B can be adjacent one another such that a desired gap ("nip") is defined therebetween. As depicted, fibers from each die 305A, 305B, 305C are horizontally directed toward and collected on the collection surfaces 380A and/or 380B to form a three layer fabric composite 350. The dies 305A, 305B, 305C can be independently movable with respect to one another. The dies 305A, 305B, 305C can also be independently movable with respect to the collection surfaces 380A, 380B to vary the die to collector distance ("DCD").

Figure 4:
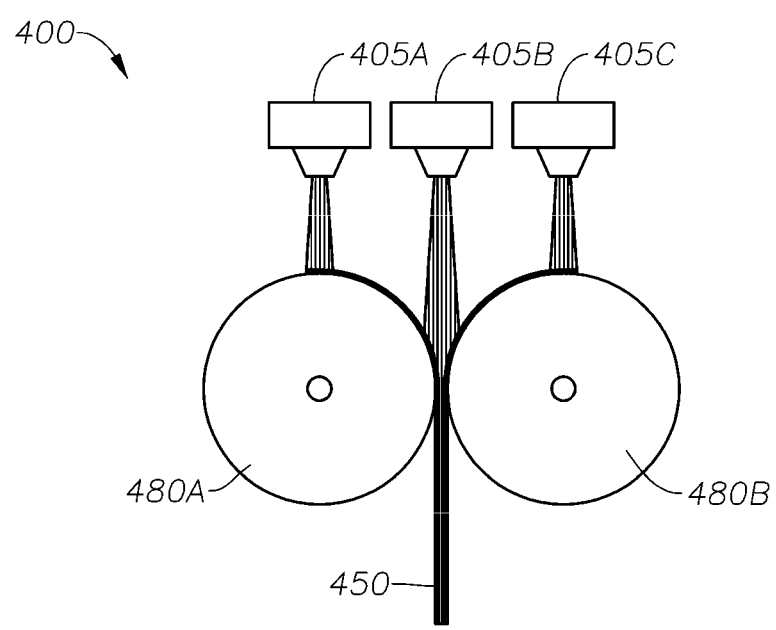
FIG. 4 depicts a schematic of another illustrative meltblowing system for making a multilayer meltblown composite, according to one or more embodiments described. As depicted, the dies and collection surfaces can be horizontally disposed.

FIG. 4 depicts a schematic of another illustrative meltblowing system 400 for making a multilayer meltblown composite 450, according to one or more embodiments. The meltblowing system 400 can include three or more horizontally arranged dies 405A, 405B, 405C and horizontally aligned collection surfaces 480A, 480B. Each die 405A, 405B, 405C can be similar to the die 200 discussed and described above with reference to FIG. 2. Each collection surface 480A, 480B can be similar to the collection drum 180, as depicted and described above with reference to FIG. 1. The dies 405A, 405B, 405C can be independently movable with respect to one another. The dies 405A, 405B, 405C can also be independently movable with respect to the collection surfaces 480A, 480B to vary the DCD.

Any resin or combination of resins can be vertically extruded through any given die 405A, 405B, 405C to provide a multi-layer composite having first and second facing layers disposed about a core layer, as described herein. As depicted, fibers from each die 405A, 405B, 405C are directed toward and collected on the collection surfaces 480A and/or 480B to form a three layer fabric composite 450.

FIG. 5 depicts a schematic of another illustrative meltblowing system 500 for making a multilayer meltblown composite 550, according to one or more embodiments. The meltblowing system 500 can include three or more dies 505A, 505B, 505C to provide a multi-layer composite having first and second facing layers disposed about a core layer, as described herein. Each die 505A, 505B, 505C can be similar to the die 200 discussed and described above with reference to FIG. 2. The meltblowing system 500 can further include two or more collection surfaces 580A, 580B that are vertically aligned. Each collection surface 580A, 580B can be similar to the collection drum 180, as depicted and described above with reference to FIG. 1.

The first die 505A and the third die 505C can be vertically aligned with respect to one another and located on opposing sides of the collection surfaces 580A, 580B. The second die 505B can be located intermediate the first and third dies 505A, 505C or provide a three layer fabric composite 550.

Any resin or combination of resins can be extruded through any given die 505A, 505B, 505C to provide the multi-layer composite 550. The dies 505A, 505B, 505C can be independently movable with respect to one another. The dies 505A, 505B, 505C can also be independently movable with respect to the collection surfaces 580A, 580B to vary the DCD.

FIG. 6 depicts a schematic of yet another illustrative meltblowing system 600 for making a multilayer meltblown composite 650, according to one or more embodiments. The meltblowing system 600 can include three or more dies 605A, 605B, 605C. Each die 605A, 605B, 605C can be similar to the die 200 discussed and described above with reference to FIG. 2. The meltblowing system 600 can further include two or more collection surfaces 680A, 680B that are vertically aligned. Each collection surface can be similar to the collection drum 180, as depicted and described above with reference to FIG. 1. Like the embodiment of FIG. 5, the first die 605A and the third die 605C can be vertically aligned with respect to one another and located on opposing sides of the collection surfaces 680A, 680B while the second die 605B can be located intermediate the first and third dies 605A, 605C.

A first facing layer 610 can be introduced to the meltblowing system 600 via the first collection surface 680A. A second facing layer 620 can also be introduced to the meltblowing system 600 via the second collection surface 680B. As shown, the collection surfaces 680A, 680B provide facing layers 610, 620, respectively, on which the fibers blown from the dies 605A, 605B, 605C, respectively, are collected. Accordingly, the resulting multilayer composite has at least five layers.

Any resin or combination of resins can be extruded through any given die 605A, 605B, 605C. The dies 605A, 605B, 605C can be independently movable with respect to one another. The dies 605A, 605B, 605C can also be independently movable with respect to the collection surfaces 180A, 180B and/or the facing layers 610, 620 disposed on the collection surfaces 180A, 180B.

Figure 7:
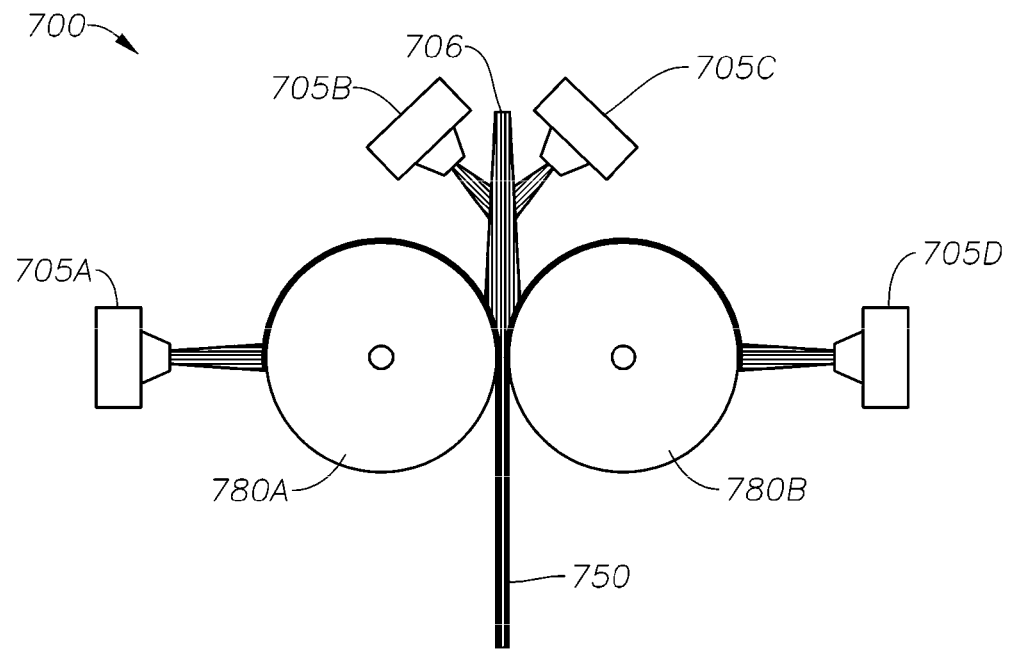
FIG. 7 depicts a schematic of still another illustrative meltblowing system for making a multilayer meltblown composite, according to one or more embodiments described. As depicted, the collection surfaces can be horizontally disposed and the dies can be arranged anywhere about the collection surfaces. Two or more dies can also be used to form the intermediate or core layer.

FIG. 7 depicts a schematic of still another illustrative meltblowing system 700, according to one or more embodiments. The meltblowing system 700 can include four or more dies 705A, 705B, 705C, 705D. Each die 705A, 705B, 705C, 705D can be similar to the die 200 discussed and described above with reference to FIG. 2. The meltblowing system 700 can further include two or more collection surfaces 780A, 780B that are horizontally aligned. Each collection surface 780A, 780B can be similar to the collection drum 180, as depicted and described above with reference to FIG. 1.

At least two dies, such as die 705A and die 705D, can be horizontally aligned with respect to one another and located on opposing sides of the collection surfaces 780A, 780B. And at least two dies, such as die 705B and die 705C, can be located intermediate the dies 705A, 705D. The dies 705A, 705B, 705C, 705D can be independently movable with respect to one another. The dies 705A, 705B, 705C, 705D can also be independently movable with respect to the collection surfaces 180A, 180B to vary the DCD.

Any resin or combination of resins can be extruded through any given die 705A, 705B, 705C, 705D to provide the multi-layer composite 750. As depicted, fibers from each die 705A, 705B, 705C, 705D are directed toward and collected on the collection surfaces 780A, 780B to form a three layer fabric composite 750. The middle or intermediate layer, i.e. "core" layer, can include a mixture of fibers produced from dies 705B, 705C. An additional layer of resin or one or more additives can be sprayed or otherwise introduced through nozzle 706 located between dies 705B and 705C.

Figure 8:
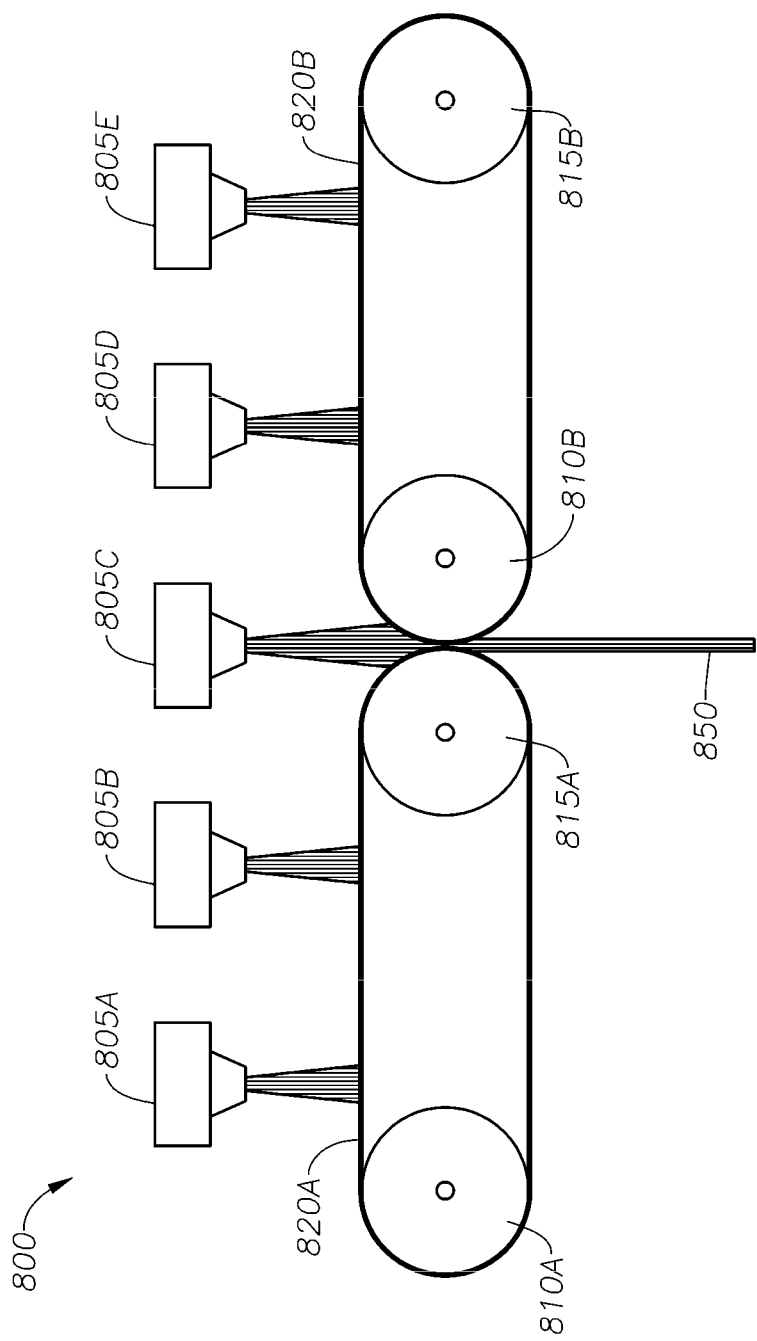
FIG. 8 depicts a schematic of yet another illustrative meltblowing system for making a multilayer meltblown composite, according to one or more embodiments described. As depicted, the collection surfaces can be horizontal belts or conveyors, and the dies can be arranged anywhere about the collection surfaces.

FIG. 8 depicts a schematic of yet another illustrative meltblowing system 800, according to one or more embodiments. The meltblowing system 800 can include five or more dies 805A, 805B, 805C, 805D, 805E. Each die 805A, 805B, 805C, 805D, 805E can be similar to the die 200 discussed and described above with reference to FIG. 2. The meltblowing system 800 can further include two or more horizontally arranged collection surfaces 820A, 820B. As depicted, a first collection surface 820A can be a conveyor belt disposed about and moved by two horizontally aligned drums 810A and 815A. Similarly, a second collection surface 820B can be a conveyor belt disposed about and moved by two horizontally aligned drums 810B, 815B. The collection surfaces 820A, 820B can be adjacent one another such that a desired gap ("nip") is defined therebetween.

Each die 805A, 805B, 805C, 805D, 805E can be horizontally aligned above the collection surfaces 820A, 820B or aligned in other spatial orientation. The dies 805A, 805B, 805C, 805D, 805E can be independently movable with respect to one another. The dies 805A, 805B, 805C, 805D, 805E can also be independently movable with respect to the collection surfaces 820A, 820B.

The collection surfaces 820A, 820B can provide a collection surface for fibers produced from the dies 805A, 805B, 805C, 805D, 805E. Any resin or combination of resins can be extruded through any given die 805A, 805B, 805C, 805D, 805E. As depicted, fibers from each die 805A, 805B, 805C, 805D, 805E are directed toward and collected on the collection surfaces 820A and/or 820B to form a five layer fabric composite 850.

Figure 9:
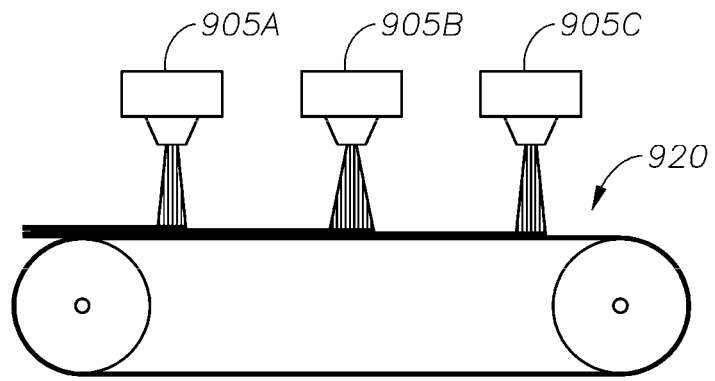
FIG. 9 depicts a schematic of still yet another illustrative meltblowing system for making a multilayer meltblown composite, according to one or more embodiments described. As depicted, a single collection surface can be used, and the dies can be arranged anywhere about the collection surfaces.

FIG. 9 depicts a schematic of still yet another illustrative meltblowing system 900 for making a multilayer meltblown composite, according to one or more embodiments described. As depicted, a single collection surface 920 can be used, and the dies 905A, 905B, 905C can be arranged anywhere about the collection surfaces.

Referring to any system or arrangement described above 100, 200, 300, 400, 500, 600, 700, 800, or 900 with regard to FIGS. 1 through 9 or elsewhere herein, the laminate may be passed through the nip between the unheated or heated smooth collection surface(s), or unheated or heated patterned collection surface(s), or a combination of two or more of these, while applying light pressure thereon, as another extensible construction is contacted with the laminate to form a multilayer construction. Given the formation of the multilayer constructions as described herein, in certain embodiments, adhesives are substantially absent from the constructions, meaning that adhesives are not used to secure the layers of fabric and/or film to one another. As used herein, an "adhesive" is a substance that is used to secure two layers of film or fabric to one another as is known in the art. Examples of adhesive substances include polyolefins, polyvinyl acetate polyamides, hydrocarbon resins, waxes, natural asphalts, styrenic rubbers, and blends thereof. Also, in each configuration 300, 400, 500, 600, 700, and 800 described, the innermost layer ("core layer") can be blown symmetrically with respect to the nip of the collection surface(s), as depicted in FIGS. 3-8, and although not shown, the innermost layer ("core layer") in each configuration 300, 400, 500, 600, 700, and 800 described can be blown asymmetrically with respect to the nip of the collection surface(s).

In one or more embodiments above or elsewhere herein, the meltblown fibers may be continuous or discontinuous and are generally within the range from 0.5 to 250 microns in average diameter, preferably less than 200 microns, less than 150 microns, less than 100 microns, less than 75 microns, less than 50 microns, less than 40 microns, less than 30 microns, less than 20 microns, less than 10 microns, less than 5 microns, less than 4 microns, less than 3 microns, less than 2 microns, or less than 1 microns. In certain embodiments, the meltblown fibers can have a diameter within the range of from 5 or 6 or 8 or 10 to 20 or 50 or 80 or 100 or 150 or 200 or 250 μm in average diameter, and in other embodiments have a diameter from less than 80 or 50 or 40 or 30 or 20 or 10 or 5 μm.

In one or more embodiments above or elsewhere herein, the fiber diameters of each layer of the multi-layered composite can be the same or different. Accordingly, a ratio of fiber diameters of adjacent layers can be the same or vary. For example, a ratio of fibers diameters of adjacent layers can range from a low of about 0.1:1 to a high of about 1:200. Such ratios can also range from about 1:150; 1:100; 1:75; 1:50; 1:25; 1:10; 1:5; or 1:2.

In one or more embodiments above or elsewhere herein, at least 1% of the fibers in any given layer of the multi-layered structure can be co-joined or married. More preferably, at least 2%, 5%, 10%, 15%, 20%, or 25% of the fibers in any given layer of the multi-layered structure can be co-joined or married. The amount of co-joined or married fibers can also range from a low of about 1%, 5%, or 10% to a high of about 25%, 35%, or 45%.

In one or more embodiments above or elsewhere herein, the fibers of any one or more layers of the multi-layered structure can exhibit or possess some extent of fusion, melting, entrainment or mechanical interlocking with the fibers of any one or more adjoining layers without a sharp delineated interface between layers.

In one or more embodiments above or elsewhere herein, at least one layer of the multi-layered structure can recover at least 80% of it original length after 100% extension and at least 70% of it original length after 200% extension. In one or more embodiments, the multi-layered structure can recover at least 80% of it original length after 100% extension and at least 70% of it original length after 200% extension.

In one or more embodiments above or elsewhere herein, the force at 50% extension of at least one layer of the multi-layered structure, upon elongating the sample to 100% of its original length and then upon unloading, is about $1.3 \times 10^{-3}$ lbf/in/gsm.

In one or more embodiments above or elsewhere herein, the multi-layered structure has a hydrohead of about 0.05 mbar/gsm or more. Preferably, the hydrohead is greater than 0.1 mbar/gsm, 0.2 mbar/gsm, 0.3 mbar/gsm, 0.4 mbar/gsm, or 0.5 mbar/gsm. The hydrohead can also range from a low of about 0.1 mbar/gsm, 0.2 mbar/gsm or 0.3 mbar/gsm to a high of about 0.7 mbar/gsm, 0.8 mbar/gsm, or 0.9 mbar/gsm.

In one or more embodiments above or elsewhere herein, the air permeability of any one or more layers of the multi-layered structure is about 0.02 $cm^3/cm^2/s$ or more. In one or more embodiments, the air permeability of the multi-layered structure is about 0.02 $cm^3/cm^2/s$ or more. The air permeability can also range from a low of about 0.02 $cm^3/cm^2/s$, 0.05 $cm^3/cm^2/s$, or 1.0 $cm^3/cm^2/s$ to a high of about 2.0 $cm^3/cm^2/s$, 3.0 $cm^3/cm^2/s$ or 5.0 $cm^3/cm^2/s$.

In one or more embodiments above or elsewhere herein, the fabrics may have a basis weight within the range of from 10 or 20 or 30 to 50 or 80 or 100 or 150 g/m². These fabrics may also be characterized by having an Ultimate Elongation from greater than 200% or 300% or 500% or 1,000%. In this manner, multilayer constructions can be formed having at least three melt-blown layers ("MMM"). Other multi-layered meltblown structures are contemplated such as $M_xQ$, $QM_xQ$, $M_x$, $QM_x$, $Q_xS$, $M_xA_yM_y$, $QM_xA_yM_yQ$, $QM_xQM_yS$, $QM_xQM_y$, $M_xQM_yQ$, $QQM_xQ$, where x is at least 3 and y is 0 to 100. For example, x can be 3 to 100; 3 to 50; 3 to 25; or 3 to 10; x can also range from a low of about 3, 4, or 5 to a high of about 6, 10, or 15; x can also range from a low of about 1, 2, 3, 4, or 5 to a high of about 6, 7, 8, 10, or 15. "M" represents a layer of meltblown fabric (where each "M" in a construction may be the same or different); "Q" represents a spunbond, spunlace, woven fabric, or film (where each "S" in a construction may be the same or different), and "A" represents one or more additives. When such adhering of the meltblown fibers to another fabric is desired, the secondary cooling air flow may be diminished and/or heated to maintain some of the melt quality and hence bonding ability of the forming elastic meltblown fibers to the fabrics upon which they are bonded.

The multilayer construction can also include an "in situ laminate" or "ISL", which is a meltspun laminate comprising two or more layers of meltspun fabrics, wherein layers that are adjacent to one another are in situ entangled with one another to define an interfacial region of mixed fibers between the layers. "In situ entangled" means that the fibers of adjacent layers engage one another at least along one edge of adjacent fabric layers as by wrapping around each other and/or one passing at least once through a fiber from an adjacent layer. The fabric layers that make up the meltspun ISLs may be the same or different, meaning that they may have the same or different chemical and/or physical characteristics. In certain embodiments, the various layers are characterized in that (a) the basis weight of the fabrics is not the same, (b) the average diameter of the fibers making up the fabrics is not the same, (c) the composition of the fabrics is not the same, (d) number density of fibers per unit area in adjacent fabrics is not the same, (e) the cross-sectional shape of the fibers is not the same, (f) the individual fiber structure is not the same (bicomponent versus mono-component), or (g) any combination of one or more of these differences. The layers that make up the meltspun ISLs may also be characterized by being entangled to a degree that prevents the layers from being easily pulled apart. In certain embodiments, the adjacent layers have a Peel Strength of greater than 10 or 20 or 30 or 40 or 50 grams, or in other embodiments within the range from 1 or 2 or 5 or 10 to 50 or 60 or 80 or 100 or 120 or 150 or 200 grams. Peel Strength referred to herein were determined essentially in accordance with ASTM D2724.13. The procedure was intended to determine the z-direction strength (bond strength) of laminated fabrics. The efficiency of bonding between component layers of a fabric was determined by measuring the force required to delaminate the fabric. Delamination is defined as the separation of the plies of a laminated fabric due to a failure of the bonding mechanism. Peel strength is the tensile force required to separate the component layers of a textile under specified conditions. In this procedure, the plies of a six inch by two inch specimen (six inches in the machine direction) were manually separated for a distance of about two inches along the length of the specimen. One layer was then clamped into each jaw of a tensile testing machine with a gauge length of one inch and the maximum force (i.e., peak load) needed to completely separate the component layers of the fabric was determined.

The ISL may also comprise a composite material made of a mixture of two or more different fibers or a mixture of fibers and particulates. Such mixtures may be formed by adding fibers and/or particulates to the gas stream in which meltspun fibers are carried so that an intimate entangled commingling of meltspun filaments and fibers and other materials, for example, wood pulp, staple fibers and particulates such as, for example, hydrocolloid (hydrogel) particulates commonly referred to as superabsorbent materials, occurs prior to collection of the meltblown fibers upon a collecting device to form a coherent web of randomly dispersed meltblown fibers and other materials such as disclosed in U.S. Pat. No. 4,100,324, which is incorporated herein by reference. If the nonwoven web is a nonwoven web of fibers, the fibers may be joined by interfiber bonding to form a coherent web structure. Interfiber bonding may be produced by thermal bonding in a spunbonding process, or entanglement between individual meltblown fibers. The fiber entangling is produced by the meltspinning process but may be generated or increased by processes such as, for example, hydraulic entangling or needlepunching. Alternatively and/or additionally a bonding agent may be used to increase the desired bonding. In certain desired embodiments, neither of these methods are used to increase entanglement. Further details concerning ISLs and methods of their making can be found in U.S. application Ser. No. 12/566,410, incorporated herein by reference.

In forming a multilayered construction, the polyolefin polymers may be meltblown onto an extensible fabric, such as a spunlace fabric, that is passed underneath or in front of the forming meltblown fabric. The melt temperature and distance between the spinnerets and the passing extensible fabric is adjusted such that the fibers are still in a melt or partial melt state when contacting the fabric(s) to form a two or three layer construction. The coated fabric(s) then has the melted or partially-melted elastic meltblown fibers/fabric adhered thereto.

The multilayered construction can then be mechanically stretched to tailor the elastic performance of the composite. Not wishing to be bound by theory, it is believed that initial stretching modifies the structure of the elastomeric components in the composite, and potentially the interfacial bonding among fibers between and/or within layers. An initial stretching can reduce the hysteresis loop, which is a measure of the energy absorbed by the elastomer during deformation. An ideal elastomer has no hysteresis, or put another way, all the energy put into the elastomer, or stored in the elastomers, is given back upon returning the elastomer to its original size and shape. There are few elastomers and even fewer elastic laminates that show ideal elastic behavior. Most if not all show some level of hysteresis. An initial loading and unloading cycle will typically reduce the hysteresis loop which means that the material or laminate is a more efficient elastomer. The mechanical stretching of elastomers and elastomeric composites can have other advantageous effects, such as reducing the peak load at deformation, potentially improved permanent set, retractive force, and adjusting the aesthetics of the outer layers/surfaces.

There are many different methods for mechanically stretching a composite in both machine direction (MD) and cross-direction (CD). Devices based upon intermeshing blades or disks are effective at incrementally stretching fabrics in either MD or CD, respectively, or both when units are placed in series. The term incremental stretching arises from the fact the fabrics are stretched in an incremental fashion across their entire width or length. The increment or distance over which the fabric is stretched is determined by the spacing of adjacent disks or blades and the distance of interpenetration between the two sets of disks or blades. Examples of this and similar technology using grooved rolls rather than separate disks can be found in U.S. Pat. Nos. 4,223,059, 4,251,585, 4,285,100, and 4,368,565. Further improvements to this basic technology allowing narrower webs/films to be efficiently stretched, or to increase the amount of stretching or vary the amount of stretch across a web can be found in U.S. Pat. Nos. 5,143,679, 5,156,793, and 5,167,897.

Other technologies are available for stretching webs that are better suited for MD stretching. An example of using nip rolls for this purpose is described in U.S. Pat. No. 7,320,948 in which sets of two nip rolls running at different speeds enable fabrics and laminates to be stretched in MD.

Fiber

The fiber can be a single component fiber. The fiber can also be a multi-component fiber formed from a process wherein at least two polymers are extruded from separate extruders and melt-blown or spun together to form one fiber. In one or more embodiments, the polymers used in the multi-component fiber are the same or substantially the same. In one or more embodiments, the polymers used in the multi-component fiber are different from each other. The configuration of the multi-component fiber can be, for example, a sheath/core arrangement, a side-by-side arrangement, a pie arrangement, an islands-in-the-sea arrangement, or a variation thereof. The fiber can also be drawn to enhance mechanical properties via orientation, and subsequently annealed at elevated temperatures, but below the crystalline melting point to reduce shrinkage and improve dimensional stability at elevated temperature.

In certain embodiments, where a separate fabric or layer is unwound into the process, such as FIG. 6 for example, and is for example used as a facing layer for the laminate, these fabrics can be continuous fibers such as found in spun-bonded fabrics, staple fibers, or discontinuous fibers, such as those found in carded fabrics. The length and diameter of the staple fibers can vary depending on the desired toughness and stiffness of the fiber reinforced composition. In one or more embodiments, the fibers have a length of ¼ inch, or a length within the range having a lower limit of ⅛ inch (0.3175 cm), or ⅙ inch (0.423 cm), and an upper limit of 1 inch (2.54 cm), or 1.5 inch (3.81 cm) or 5 inch (12.70 cm). In one or more embodiments, the diameter of the fibers is within the range having a lower limit of 0.1 microns and an upper limit of 100 microns. The diameters can also range from a low of 0.1 microns, 0.5 microns, or 1.0 microns to a high of about 5 microns, 10 microns or 15 microns. Suitable ranges also include 0.1 to 8 microns; 0.2 to 7 microns; 0.3 to 6 microns, 0.1 to 5 microns; and 0.1 to 3 microns.

In certain embodiments, the mechanical properties of the meltblown fabrics (or multilayer constructions) described herein can be enhanced by a stretching or orientation process. Annealing can be combined with mechanical orientation, in either or both the CD or the MD. If desired, mechanical orientation can be done by the temporary, forced extension of the fabric for a short period of time before it is allowed to relax in the absence of the extensional forces. In the meltblowing process, there may be some degree of orientation of the fibers in the MD imparted due to the laydown or spinning process alone. But in certain embodiments, no additional mechanical orientation or stretching is needed. Thus, in certain embodiments, the meltblown fabrics described herein have a low degree of, or no, orientation. In other embodiments, orientation is imparted in the CD but not the MD. Thus, in certain embodiments the meltblown fabric possesses an MD Elongation less than 20 or 50 or 80 or 100% and a CD Elongation greater than 100 or 200 or 300%. Stated another way, the meltblown fabric possesses a CD/MD elongation at break ratio of between 0.1 or 0.5 and 2 or 3 or 5 or 7 or 10.

In one embodiment, the formation of the elastic fibers and fabrics includes an annealing step with or without mechanical orientation. Annealing may also be done after fabrication of the fabric from the elastic fibers. In certain embodiments, the elastic meltblown fiber or fabric is annealed at a temperature within the range from 50° C. or 60° C. to 130° C. or 160° C. Thermal annealing of the fabric is conducted by maintaining the fabric at a temperature within the range above for a period from 1 second to 1 minute, preferably between 1 and 10 seconds. The annealing time and temperature can be adjusted for any particular copolymer or copolymer composition. In another embodiment, the meltblown fabrics can be annealed in a single-step by a heated roll during calendaring under low tension. In other embodiments, the meltblown fabrics require little to no post fabrication processing.

In certain embodiments, the forming multilayer construction is further processed by passing the multilayer construction through a hydroentangling apparatus, thus further bonding the web of elastic fibers to each other or other adjacent fabric layers by interlocking and entangling the fibers about each other with high velocity streams of water. Hydroentangling is known in the art and described in some detail by A. M. Seyam et al., "An Examination of the Hydroentangling Process Variables," in INT'L NONWOVENS J. 25-33 (Spring 2005).

As mentioned above, the fibers can be continuous (long fibers) or discontinuous (short fibers). Long fibers will have a length to diameter aspect ratio greater than 60, preferably 200 to 500; and the short fibers will have a length to diameter aspect ratio less than 60, preferably 20 to 60. The number of fibers per square inch (fiber density) of the meltblown fabric preferably ranges from a low of 20 fibers/in$^2$, 40 fibers/in$^2$, or 50 fibers/in$^2$ to a high of 100 fibers/in$^2$, 250 fibers/in$^2$, or 500 fibers/in$^2$. Suitable ranges also include: 25 fibers/in$^2$ to 400 fibers/in$^2$; 50 fibers/in$^2$ to 300 fibers/in$^2$; 60 fibers/in$^2$ to 200 fibers/in$^2$; 20 fibers/in$^2$ to 80 fibers/in$^2$; and 30 fibers/in$^2$ to 70 fibers/in$^2$.

In certain embodiments, the multilayer construction can be processed to form constraints. The constraints can take the form of "inelastic zones" (or "deadzones") in the multilayer construction that aid in its processing to form a final article such as a diaper or adult incontinence garment. At least one portion of the layers are fused to one another in discrete zones that are parallel to the CD of the biaxially elastic laminate, parallel to the MD of the biaxially elastic laminate, or at some orientation there between. The inelastic zones may have dimensions such that its length is continuous or discontinuous from one edge of the fabric to the other, and has a width of, for example, at least 1 or 2 or 3 or 5 or 10 mm. The inelastic zones may take any shape.

In certain embodiments, one or more, or all, of the layers of the constrained multilayer laminate are not adhered to one another but are merely adjacent to one another. In other embodiments, at least two layers, or all the layers, of the constrained multilayer laminate are adhered to one another. A "constraining means" is any device, substance or process that is capable of fusing at least a portion of one layer to another layer to create at least one inelastic zone. The process of "fusing" creates an area on the constrained multilayer laminate that is no longer "elastic," and may comprise fusing one adjacent layer to the elastic layer(s), or substantially (at least 90%) fusing all of the layers, up to the fusing of all layers throughout the full thickness (all layers) of the constrained multilayer laminate. In certain embodiments, fusing discrete zones creates zones that possess an elasticity that is at least 40% or 50% or 60% or 70% or 80% or 90% or 98% less elastic relative to the initial elasticity of the meltspun elastic fabric.

Fusing may be achieved by any means such as by heating the layers to form an adherence between at least two layers, or hydroentangling at least two of the layers, or ultrasonic means, electronic means, or other suitable means for adhering the layers to one another. It can be performed by any suitable means such as by calendering, adhesives, sonic energy, microwave energy or other electromagnetic energy, or other processes known in the art. Adhesives may be used in fusing, but in certain embodiments, the application of adhesives is absent from the fusing step. Examples of adhesives include those comprising low weight average molecular weight (<80,000 g/mole) polyolefins, polyvinyl acetate polyamide, hydrocarbon resins, natural asphalts, styrenic rubbers, polyisoprene and blends thereof.

By referring to the "inelastic zone" created by the fusing step as "inelastic," what is meant is that its elasticity is less than that defined above for a material that is "elastic." The inelastic zone may take on any "discrete" shape or form suitable to the desired end use, such as a diaper or adult incontinence garment. For example, the inelastic zones may take the form of a long line or block having a length that is at least twice or three times its width. In some embodiments the inelastic zone defines an area of irregular shape, or non-linear shape such as a circle, arc or shapes comprising such features.

In a specific embodiment the fusing comprises calendering the biaxially elastic nonwoven laminate to melt at least a portion of the meltspun elastic fabric and create an fusion of the one or more elastic fabrics to at least one extensible fabric. In a particular embodiment, the fusing step is carried out by means of a calender with raised heated zoning patterns. In certain embodiments, the fusing further introduces an embossed pattern in the laminate. The fusing and embossing step may be carried out by means of a calender with intermeshing rolls that are optionally heated. Also, the fusing and embossing step may be carried out by means of patterned intermeshing vacuum drums running under a vacuum differential, or other suitable means.

In certain embodiments, the fusing is performed such that a degree of elasticity is maintained in the CD of the constrained multilayer laminate, the MD of the constrained multilayer laminate, or some degree there between and/or combination thereof. For example, the fusing may be such that the constrained multilayer laminate is only elastic in the CD direction, or 45° from the CD direction, or 20° from the CD direction, or in the range of from 90° to 20° or 45°, etc. Also, the elasticity in the constrained multilayer laminate may be such that both CD and MD elasticity is reduced but not complete removed. In a specific embodiment, at least one portion of the bound fabric layers are fused in discrete zones that are parallel to the CD of the biaxially elastic laminate, parallel to the MD of the biaxially elastic laminate, or at some orientation there between.

In certain embodiments the laminate has a CD width and an inelastic zone running perpendicular to the CD of the laminate, the inelastic zone having a CD width of at least 2 or 5 or 10 or 20% of the CD width of the laminate. In yet other embodiments the laminate has a CD width and an inelastic zone running perpendicular to the MD of the laminate, the inelastic zone having a MD width of at least 2 or 5 or 10 or 20% of the CD width of the laminate. Further disclosure on constrained laminates and methods of constraining them is found in U.S. application Ser. No. 12/566,434, incorporated herein by reference.

Specific Layer Blends

In one or more preferred embodiments, at least one layer of the multilayer composite includes at least one propylene-based or ethylene-based homopolymers or random, block, or graft copolymers comprising none (i.e. homopolymers) or from 0.1 wt % or 1 wt % or 2 wt % or 5 wt % to 10 wt % or 15 wt % or 20 wt % or 45 wt %, by weight of the polymer, of comonomer-derived units selected from ethylene and $C_4$-$C_{10}$ α-olefins (propylene-based polymers) and $C_3$-$C_{10}$ α-olefins (ethylene-based polymers). Preferably, at least one layer of the multilayer composite includes one or more polypropylenes within the range of from about 50 wt % to 99 wt %; or 60 wt % to 95 wt %; or 50 wt % to 90 wt %; or 55 wt % to 85 wt %, by weight of the fabric layer/composition. In one or more embodiments, at least one layer of the multilayer composite consists essentially of one or more polypropylenes.

In one or more embodiments, the core layer includes a blend of at least one propylene-α-olefin copolymer resin and at least one polypropylene resin. For example, a preferred blend includes 50 wt % of one or more propylene-α-olefin copolymer resins and 50 wt % of one or more polypropylene resins. The amount of the propylene-α-olefin copolymer resin in the blend can range from a low of about 20 wt %, 30 wt %, or 40 wt % to a high of about 60 wt %, 70 wt %, or 90 wt %. The amount of the polypropylene resin in the blend can range from a low of about 1 wt %, 5 wt %, or 10 wt % to a high of about 20 wt %, 30 wt %, or 45 wt %.

In one or more preferred embodiments, at least one facing layer includes a blend of polypropylene and less than 50 wt % of one or more blend components. The blend component can be one or more impact copolymers, one or more random copolymers (RCP), one or more polyethylenes, one or more polyethylenes having a Mw of less than 20,000 g/mol, one or more polypropylenes having a Mw of less than 20,000 g/mol, one or more polyalphaolefins, or any combination(s) thereof. The amount of the blend component (not the polypropylene) can be present in an amount ranging from a low of about 0.5 wt %, 1 wt %, or 5 wt % to a high of about 30 wt %, 40 wt %, or 50 wt %. For example, the amount of the blend component can be of from about 1 wt % to 49 wt %; or about 5 wt % to 45 wt %; or about 5 wt % to 40 wt %; or about 5 wt % to 25 wt %.

The MFR (ASTM D1238, 230° C., 2.16 kg) of the facing layer resin or blend is preferably less than 2,000 dg/min (g/10 min), more preferably 1,500 dg/min or less, 1,200 dg/min or less, 900 dg/min or less, 600 dg/min or less, 300 dg/min or less, 200 dg/min or less, 150 dg/min or less, 100 dg/min or less, or 90 dg/min or less. In certain embodiments, the MFR of the extensible resin or blend can range from a low of about 50 dg/min, 75 dg/min, or 80 dg/min to a high of about 250 dg/min, 500 dg/min, or 1,000 dg/min. The MFR of the facing layer resin or blend can also range from a low of about 20 dg/min, 30 dg/min, or 40 dg/min to a high of about 90 dg/min, 120 dg/min, or 150 dg/min. The MFR of the facing layer resin or blend can also range from a low of about 20 dg/min, 35 dg/min, or 45 dg/min to a high of about 65 dg/min, 80 dg/min, or 95 dg/min. The MFR of the facing layer resin or blend can further range from a low of about 0.1 dg/min, 0.5 dg/min, 1 dg/min, or 5 dg/min to a high of about 30 dg/min, 40 dg/min, 70 dg/min, or 90 dg/min.

The weight average molecular weight (Mw) of the facing layer resin or blend is preferably less than 500,000; 400,000; 300,000; or 250,000. For example, the Mw of the facing layer resin or blend can range from about 50,000 to about 200,000. In one or more embodiments, the Mw of the facing layer resin or blend can range from a low of about 50,000, 80,000, or 100,000 to a high of about 155,000, 170,000, or 190,000. In one or more embodiments, the Mw of the facing layer resin or blend can range from about 80,000 to about 200,000; 100,000 to about 175,000; or 140,000 to about 180,000.

The MFR (ASTM D1238, 230° C., 2.16 kg) of the core layer resin or blend is preferably less than 2,000 dg/min (g/10 min), more preferably 1,500 dg/min or less, 1,200 dg/min or less, 900 dg/min or less, 600 dg/min or less, 300 dg/min or less, 200 dg/min or less, 150 dg/min or less, 100 dg/min or less, or 90 dg/min or less. In certain embodiments, the MFR of the core layer resin or blend can range from a low of about 50 dg/min, 75 dg/min, or 80 dg/min to a high of about 250 dg/min, 500 dg/min, or 1,000 dg/min. The MFR of the core layer resin or blend can also range from a low of about 20 dg/min, 30 dg/min, or 40 dg/min to a high of about 90 dg/min, 120 dg/min, or 150 dg/min. The MFR of the core layer resin or blend can also range from a low of about 25 dg/min, 35 dg/min, or 45 dg/min to a high of about 75 dg/min, 85 dg/min, or 95 dg/min. The MFR of the core layer resin or blend can further range from a low of about 0.1 dg/min, 0.5 dg/min, 1 dg/min, or 5 dg/min to a high of about 30 dg/min, 40 dg/min, 70 dg/min, or 90 dg/min. In at least one specific embodiment, the MFR of the core layer resin or blend ranges from about 2 dg/min to about 90 dg/min; about 2 dg/min to about 20 dg/min; about 3 dg/min to about 90 dg/min; or about 3 dg/min to about 20 dg/min.

The weight average molecular weight (Mw) of the core layer resin or blend is preferably less than 500,000; 400,000; 300,000; or 250,000. For example, the Mw of the core layer resin or blend can range from about 50,000 to about 290,000. In one or more embodiments, the Mw of the core layer resin or blend can range from a low of about 50,000, 65,000, or 80,000 to a high of about 130,000, 190,000, or 290,000. In one or more embodiments, the Mw of the core layer resin or blend can range from about 80,000 to about 285,000; 80,000 to about 240,000; or 80,000 to about 140,000.

One method of characterizing multilayer construct elasticity is to determine a hysteresis curve according to the following cyclic testing procedure. Generally, a sample of nonwoven fabric is stretched one or more times using an Instron 1130 instrument, which is commercially available from Instron Corporation. Unless stated otherwise, the test parameters used herein to generate hysteresis curves are: sample width=1 inch, sample length=3 inches, gauge length, i.e., distance between clamps, is 1 inch, crosshead speed, i.e., speed of top clamp that is applying a stretching force, is 10 in/min. As used herein "first cycle" and "second cycle" refer to the number of times an individual sample has been stretched.

Samples are tested by first cutting a nonwoven fabric sample to the specified sample size. Each test sample is loaded in to an Instron 1130 instrument by first attaching the sample to the crosshead/top clamp and then to the bottom clamp. The distance between the clamps is the specified gauge length. No pre tension is applied on the sample.

The sample is then stretched to the desired strain, e.g., 100%, or 200%, as measured by sample length, using a crosshead speed, i.e., stretch speed, of 10 in/min. The sample is then returned to zero load at the same crosshead speed without any hold time. The force on the sample as a function of strain during extension and retraction is recorded.

The sample is removed from the instrument for further characterization or stretched one or more times if additional cycles data was desired, e.g., second cycle data. Second cycle hysteresis curves are prepared by remounting samples already tested in a first cycle. Samples are mounted using the same gauge length unless specifically reported otherwise. The same procedure described above for the first cycle is utilized for the second cycle.

Unless described otherwise herein, permanent set is the amount of strain remaining in a sample after retraction from a specified strain expressed as a percentage of the specified strain. The elongation remaining in the sample at zero load after retraction (as determined by the intercept of the retraction curve with the x-axis) is divided by the maximum elongation the sample was stretched during that cycle.

Unless described otherwise herein, retractive force at 50% is the force exerted by a sample after stretching to a given elongation and allowing the sample to retract to one-half of that elongation.

Unless described otherwise herein, peak load (lbs/in) is the maximum load in pounds force exerted on the sample during extension divided by the width of the sample in inches.

Unless described otherwise herein, peak force MD (N) is the maximum force exerted on a sample during extension in the machine direction (MD) expressed in Newtons.

Unless described otherwise herein, peak force CD (N) is the maximum force exerted on a sample during extension in the cross direction (CD) expressed in Newtons.

Unless described otherwise herein, elongation at break MD (%) is the increase in length of a sample measured at the breaking point after extension in the machine direction divided by the original gauge length expressed as a percentage.

Unless described otherwise herein, elongation at break CD (%) is the increase in length of a sample measured at its breaking point after stretching in the cross direction divided by the original gauge length expressed as a percentage.

Articles

The multilayer constructions are particularly useful for applications requiring any one or more of the following properties or attributes: absorbency, liquid repellency, resilience, stretch, softness, strength, flame retardancy, washability, cushioning, filtering, bacterial barrier, and sterility. Illustrative applications and uses can include, but are not limited to, hygiene, medical, filters, and geotextiles, among others.

For example, the multilayer constructions can be used to make baby diapers, feminine hygiene napkins, adult incontinence products, personal hygiene wipes, bandages, wound dressings, air filters, liquid filters, household wipes, shop towels, battery separators, vacuum cleaner bags, cosmetic pads, food packaging, clothing, apparels, medical garments, and disposable underwear. Particularly suitable uses include closure systems on baby diapers, pull-ups, training pants, adult incontinence briefs and diapers, bandages, and other single use or disposable items.

Common filtering uses include gasoline, oil and air filters; water, coffee and tea bags; liquid cartridge and bag filters; vacuum bags; and allergen membranes. Illustrative geotextiles and uses thereof include soil stabilizers and roadway underlayment, foundation stabilizers, erosion control, canals construction, drainage systems, geomembranes protection, frost protection, agriculture mulch, pond and canal water barriers, and sand infiltration barrier for drainage tile.

Additional articles and uses of the multilayer construction provided herein can include, for example, carpet backing, marine sail laminates, table cover laminates, chopped strand mat, backing/stabilizer for machine embroidery, packaging, insulation, pillows, cushions, and upholstery padding, batting in quilts or comforters, consumer and mailing envelopes, tarps, as well as tenting and transportation (lumber, steel) wrapping.

The entire article can be formed from the multiplayer constructions, or the multilayer constructions can form individual sections or portions thereof. For example, in baby diapers, it is envisaged that the multilayer constructions form at least part of the back sheet, wings, and/or tabs.

Other embodiments can further include:

1. A method for forming a multilayer meltblown composite, comprising:
   meltblowing a first material to form a first meltblown layer;
   meltblowing a second material to form a second meltblown layer; and
   meltblowing a third material to form a third meltblown layer, wherein each material is the same or different, each material includes at least one resin having a MFR of about 2,000 dg/min or less, as measured by ASTM D1238, 2.16 kg, 230° C., and at least one of the first, second, and third materials comprises an elastomer having a recovery of at least 70% after 100% deformation, as determined by ASTM D412.
2. The method according to paragraph 1, wherein each meltblown layer has a basis weight within the range of from 5 g/m² to 300 g/m².
3. The method according to paragraph 1 or 2, wherein each meltblown layer has a basis weight within the range of from 10 g/m² to 150 g/m².
4. The method according to any of paragraphs 1 to 3, wherein the first meltblown layer has a basis weight within the range of from 5 g/m² to 300 g/m²; the second meltblown layer has a basis weight within the range of from 15 g/m² to 150 g/m²; and the third meltblown layer has a basis weight within the range of from 5 g/m² to 300 g/m².
5. The method according to any of paragraphs 1 to 4, wherein the elastomer is a propylene-α-olefin copolymer having a heat of fusion of 75 J/g or less.
6. The method according to any of paragraphs 1 to 5, wherein the second meltblown layer comprises at least 5 wt % of the propylene-α-olefin copolymer having a heat of fusion of 75 J/g or less.
7. The method according to any of paragraphs 1 to 6, wherein the second meltblown layer comprises at least 10 wt % of the propylene-α-olefin copolymer having a heat of fusion of 75 J/g or less.
8. The method according to any of paragraphs 1 to 7, further comprising mechanically stretching the multilayer composite in the machine direction (MD), cross direction (CD) or both MD and CD directions.
9. The method according to any of paragraphs 1 to 8, wherein the melt temperature of the second meltblown layer is about 325° C. or less.
10. The method according to any of paragraphs 1 to 9, wherein the first and third meltblown layers comprise homopolypropylene, polypropylene, polyethylene, or blends thereof.
11. The method according to any of paragraphs 1 to 10, wherein each material has a MFR (ASTM D1238, 2.16 kg, 230° C.) of less than 25 dg/min.
12. The method according to any of paragraphs 1 to 11, wherein each material has a MFR (ASTM D1238, 2.16 kg, 230° C.) of less than 50 dg/min.
13. The method according to any of paragraphs 1 to 12, wherein the second meltblown layer is at least 10 wt % of the total weight of the multilayer composite.
14. The method according to any of paragraphs 1 to 13, wherein the second meltblown layer is disposed between the first and third meltblown layers.
15. The method according to any of paragraphs 1 to 14, wherein each material is meltblown onto a moving surface.
16. A multilayer meltblown composite, comprising:
   a first meltblown layer comprising one or more resins having an Ultimate Elongation (UE) of from about 50% to about 250%, as measured according to ASTM D412;
   a second meltblown layer comprising one or more resins having an Ultimate Elongation (UE) of 200% or more, as measured according to ASTM D412; and
   a third meltblown layer comprising one or more resins having an Ultimate Elongation (UE) of from about 50% to about 250%, as measured according to ASTM D412;
   wherein each resin has a MFR of about 2,000 dg/min or less, as measured by ASTM D1238, 2.16 kg, 230° C., and at least one of the first, second, and third meltblown layers comprises a propylene-α-olefin copolymer having a heat of fusion of 75 J/g or less.
17. The meltblown composite according to paragraph 16, wherein each meltblown layer has a basis weight within the range of from 5 g/m² to 300 g/m².
18. The meltblown composite according to paragraphs 16 or 17, wherein each meltblown layer has a basis weight within the range of from 10 g/m² to 150 g/m².
19. The meltblown composite according to any of paragraphs 16 to 18, wherein the first meltblown layer has a basis weight within the range of from 5 g/m² to 300 g/m²; the second meltblown layer has a basis weight within the range of from 15 g/m² to 150 g/m²; and the third meltblown layer has a basis weight within the range of from 5 g/m² to 300 g/m².
20. The meltblown composite according to any of paragraphs 16 to 19, wherein the second meltblown layer comprises at least 10 wt % of the propylene-α-olefin copolymer having a heat of fusion of 75 J/g or less.
21. The meltblown composite according to any of paragraphs 16 to 20, wherein the first and third meltblown layers each comprises at least 5 wt % of the propylene-α-olefin copolymer having a heat of fusion of 75 J/g or less.
22. The meltblown composite according to any of paragraphs 16 to 21, wherein the first and third meltblown layers each comprises at least 5 wt % of polypropylene.
23. The meltblown composite according to any of paragraphs 16 to 22, wherein the melt temperature of the second meltblown layer is about 325° C. or less.
24. The meltblown composite according to any of paragraphs 16 to 23, wherein the first and third meltblown layers comprise homopolypropylene, polypropylene, polyethylene, or blends thereof.
25. The meltblown composite according to any of paragraphs 16 to 24, wherein each resin has a MFR (ASTM D1238, 2.16 kg, 230° C.) of less than 25 dg/min.
26. The meltblown composite according to any of paragraphs 16 to 25, wherein each resin has a MFR (ASTM D1238, 2.16 kg, 230° C.) of less than 50 dg/min.
27. The meltblown composite according to any of paragraphs 16 to 26, wherein the second meltblown layer is at least 10 wt % of the total weight of the multilayer composite.
28. The meltblown composite according to any of paragraphs 16 to 27, wherein the second meltblown layer is disposed between the first and third meltblown layers.

29. An article of manufacture, incorporating as one or more components, a multilayer meltblown composite having:
a first meltblown layer comprising one or more resins having an Ultimate Elongation (UE) of from about 50% to about 250%, as measured according to ASTM D412;
a second meltblown layer comprising one or more resins having an Ultimate Elongation (UE) of 200% or more, as measured according to ASTM D412; and
a third meltblown layer comprising one or more resins having an Ultimate Elongation (UE) of from about 50% to about 250%, as measured according to ASTM D412,
wherein each resin has a MFR of about 2,000 dg/min or less, as measured by ASTM D1238, 2.16 kg, 230° C., and at least one of the first, second, and third meltblown layers comprises a propylene-α-olefin copolymer having a heat of fusion of 75 J/g or less.

30. The article according to paragraph 29, wherein the article is a garment.

31. The article according to any of paragraphs 29 or 30, wherein the article is a baby or adult incontinence diaper, training pant or pull-up or femcare product.

32. The article according to any of paragraphs 29 to 31, wherein the article is a filter.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for forming a multilayer meltblown composite, consisting of:
meltblowing a first material to form a first meltblown layer, wherein the first material comprises one or more resins having an Ultimate Elongation (UE) of from about 50% to about 250%;
meltblowing a second material to form a second meltblown layer, wherein the second material comprises one or more resins having an Ultimate Elongation (UE) of 200% or more; and
meltblowing a third material to form a third meltblown layer, wherein the third material comprises one or more resins having an Ultimate Elongation (UE) of from about 50% to about 250%;
wherein each resin has a MFR of about 2,000 dg/min or less, as measured by ASTM D1238, 2.16 kg, 230° C., and at least one of the first, second, and third materials comprises a propylene-α-olefin copolymer having a heat of fusion of 75 J/g or less and having a recovery of at least 70% after 100% deformation, as measured by ASTM D412,
wherein the first, second, and third meltblown layers are formed in situ such that the layers form an in situ laminate;
wherein the first and the third meltblown layers are facing layers; and
wherein at least one of the facing layers consists of (a) polypropylene, wherein the polypropylene has a heat of fusion ranging from 60 J/g to 189 J/g, and (b) about 0.5 wt % of a blend component, wherein the blend component is selected from the group consisting of impact copolymers, random copolymers, polyethylenes, polyethylenes with a weight average molecular weight of less than 20,000 g/mol, polypropylenes having a weight average molecular weight of less than 20,000 g/mol, polyalphaolefins, and combinations thereof.

2. The method of claim 1, wherein each meltblown layer has a basis weight within the range of from 5 g/m$^2$ to 300 g/m$^2$.

3. The method of claim 1, wherein each meltblown layer has a basis weight within the range of from 10 g/m$^2$ to 150 g/m$^2$.

4. The method of claim 1, wherein the first meltblown layer has a basis weight within the range of from 5 g/m$^2$ to 300 g/m$^2$; the second meltblown layer has a basis weight within the range of from 15 g/m$^2$ to 150 g/m$^2$; and the third meltblown layer has a basis weight within the range of from 5 g/m$^2$ to 300 g/m$^2$.

5. The method of claim 1, wherein the second meltblown layer comprises at least 5 wt % of the propylene-α-olefin copolymer having a heat of fusion of 75 J/g or less.

6. The method of claim 5, wherein the second meltblown layer comprises at least 10 wt % of the propylene-α-olefin copolymer having a heat of fusion of 75 J/g or less.

7. The method of claim 1, wherein the melt temperature of the second meltblown layer is about 325° C. or less.

8. The method of claim 1, wherein each material has a MFR (ASTM D1238, 2.16 kg, 230° C.) of less than 50 dg/min.

9. The method of claim 1, wherein the second meltblown layer is at least 10 wt % of the total weight of the multilayer composite.

10. The method of claim 1, wherein the second meltblown layer is disposed between the first and third meltblown layers.

11. The method of claim 1, wherein each material is meltblown onto a moving surface.

12. A multilayer meltblown composite, consisting of:
a first meltblown layer comprising one or more resins wherein said one or more resins has an Ultimate Elongation (UE) of from about 50% to about 250%;
a second meltblown layer comprising one or more resins wherein said one or more resins has an Ultimate Elongation (UE) of 200% or more; and
a third meltblown layer comprising one or more resins wherein said one or more resins has an Ultimate Elongation (UE) of from about 50% to about 250%;
wherein each resin has a MFR of about 2,000 dg/min or less, as measured by ASTM D1238, 2.16 kg, 230° C., and at least one of the first, second, and third meltblown layers comprises a propylene-α-olefin copolymer having a heat of fusion of 75 J/g or less and having a recovery of at least 70% after 100% deformation, as determined by ASTM D412;

wherein the first, second, and third meltblown layers are formed in situ such that the layers form an in situ laminate;

wherein the first and the third meltblown layers are facing layers; and wherein at least one of the facing layers consists of (a) polypropylene, wherein the polypropylene has a heat of fusion ranging from 60 J/g to 189 J/g, and (b) about 0.5 wt % of a blend component, wherein the blend component is selected from the group consisting of impact copolymers, random copolymers, polyethylenes, polyethylenes with a weight average molecular weight of less than 20,000 g/mol, polypropylenes having a weight average molecular weight of less than 20,000 g/mol, polyalphaolefins, and combinations thereof.

13. The meltblown composite of claim 12, wherein each meltblown layer has a basis weight within the range of from 5 g/m$^2$ to 300 g/m$^2$.

14. The meltblown composite of claim 12, wherein the first meltblown layer has a basis weight within the range of from 5 g/m$^2$ to 300 g/m$^2$; the second meltblown layer has a basis weight within the range of from 15 g/m$^2$ to 150 g/m$^2$; and the third meltblown layer has a basis weight within the range of from 5 g/m$^2$ to 300 g/m$^2$.

15. The meltblown composite of claim 12, wherein the second meltblown layer comprises at least 10 wt % of the propylene-α-olefin copolymer having a heat of fusion of 75 J/g or less.

16. The meltblown composite of claim 12, wherein one of the first and third meltblown layers comprises at least 5 wt % of the propylene-α-olefin copolymer having a heat of fusion of 75 J/g or less.

17. The meltblown composite of claim 12, wherein the melt temperature of the second meltblown layer is about 325° C. or less.

18. The meltblown composite of claim 12, wherein each resin has a MFR (ASTM D1238, 2.16 kg, 230° C.) of less than 50 dg/min.

19. The meltblown composite of claim 12, wherein the second meltblown layer is at least 10 wt % of the total weight of the multilayer composite.

20. The meltblown composite of claim 12, wherein the second meltblown layer is disposed between the first and third meltblown layers.

21. An article of manufacture, incorporating as one or more components, a multilayer meltblown composite consisting of:

a first meltblown layer comprising one or more resins wherein said one or more resins has an Ultimate Elongation (UE) of from about 50% to about 250%;

a second meltblown layer comprising one or more resins wherein said one or more resins has an Ultimate Elongation (UE) of 200% or more; and a third meltblown layer comprising one or more resins wherein said one or more resins has an Ultimate Elongation (UE) of from about 50% to about 250%, wherein each resin has a MFR of about 2,000 dg/min or less, as measured by ASTM D1238, 2.16 kg, 230° C., and at least one of the first, second, and third meltblown layers comprises a propylene-α-olefin copolymer having a heat of fusion of 75 J/g or less and having a recovery of at least 70% after 100% deformation, as determined by ASTM D412;

wherein the first, second, and third meltblown layers are formed in situ such that the layers form an in situ laminate;

wherein the first and the third meltblown layers are facing layers; and wherein at least one of the facing layers consists of (a) polypropylene, wherein the polypropylene has a heat of fusion ranging from 60 J/g to 189 J/g, and (b) about 0.5 wt % of a blend component, wherein the blend component is selected from the group consisting of impact copolymers, random copolymers, polyethylenes, polyethylenes with a weight average molecular weight of less than 20,000 g/mol, polypropylenes having a weight average molecular weight of less than 20,000 g/mol, polyalphaolefins, and combinations thereof.

* * * * *